United States Patent
Kato et al.

(10) Patent No.: US 10,431,243 B2
(45) Date of Patent: Oct. 1, 2019

(54) SIGNAL PROCESSING APPARATUS, SIGNAL PROCESSING METHOD, SIGNAL PROCESSING PROGRAM

(71) Applicant: NEC Corporation, Minato-ku, Tokyo (JP)

(72) Inventors: Masanori Kato, Tokyo (JP); Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/782,928

(22) PCT Filed: Mar. 27, 2014

(86) PCT No.: PCT/JP2014/058962
§ 371 (c)(1),
(2) Date: Oct. 7, 2015

(87) PCT Pub. No.: WO2014/168022
PCT Pub. Date: Oct. 16, 2014

(65) Prior Publication Data
US 2016/0071529 A1 Mar. 10, 2016

(30) Foreign Application Priority Data
Apr. 11, 2013 (JP) .................. 2013-083412

(51) Int. Cl.
*G10L 25/84* (2013.01)
*G10L 17/26* (2013.01)
(Continued)

(52) U.S. Cl.
CPC .............. *G10L 25/84* (2013.01); *G10L 17/00* (2013.01); *G10L 17/26* (2013.01); *G10L 25/18* (2013.01)

(58) Field of Classification Search
USPC ....... 704/246, 233, 232, 208, 273, 209, 207, 704/201, 231; 379/88.03
See application file for complete search history.

(56) References Cited

U.S. PATENT DOCUMENTS 5,189,701 A * 2/1993 Jain .................. G10L 25/90
704/207
6,978,236 B1* 12/2005 Liljeryd .............. G10L 19/0208
704/200

(Continued)

FOREIGN PATENT DOCUMENTS

CN 1296258 A 5/2001
CN 101027719 A 8/2007
(Continued)

OTHER PUBLICATIONS

International Search Report of PCT Application No. PCT/JP2014/058962 dated Jun. 17, 2014.
(Continued)

*Primary Examiner* — Neeraj Sharma

(57) ABSTRACT

This invention provides a signal processing apparatus for improving the speech determination accuracy in an input sound. The signal processing apparatus includes a transformer that transforms an input signal into an amplitude component signal in a frequency domain, a calculator that calculates a norm of a change in the amplitude component signal in a frequency direction, an accumulator that accumulates the norm of the change in the amplitude component signal in the frequency direction calculated by the calculator, and an analyzer that analyzes speech in the input signal in accordance with an accumulated value of the norm of the change in the amplitude component signal in the frequency direction calculated by the accumulator.

5 Claims, 20 Drawing Sheets

(51) Int. Cl.
*G10L 25/18* (2013.01)
*G10L 17/00* (2013.01)

(56) References Cited

U.S. PATENT DOCUMENTS

| | | | |
|---|---|---|---|
| 7,158,932 B1 | 1/2007 | Furuta | |
| 7,240,007 B2* | 7/2007 | Junqua | G10L 15/24 704/246 |
| 7,567,900 B2* | 7/2009 | Suzuki | G10L 25/78 704/208 |
| 7,660,718 B2* | 2/2010 | Padhi | G10L 25/90 704/205 |
| 8,249,270 B2* | 8/2012 | Matsuo | G10L 21/0208 381/94.1 |
| 8,280,727 B2* | 10/2012 | Endo | G10L 21/038 704/201 |
| 8,332,223 B2* | 12/2012 | Farrell | G07C 9/00158 379/88.03 |
| 8,532,986 B2* | 9/2013 | Matsumoto | G10L 25/93 704/208 |
| 8,775,187 B2* | 7/2014 | Summerfield | G06F 21/32 704/273 |
| 8,793,127 B2* | 7/2014 | Printz | G06Q 30/02 704/232 |
| 8,818,539 B2* | 8/2014 | Suzuki | G10L 19/0204 381/17 |
| 8,831,942 B1* | 9/2014 | Nucci | G10L 17/26 704/207 |
| 8,924,209 B2* | 12/2014 | Newman | G10L 25/51 704/208 |
| 9,099,088 B2* | 8/2015 | Washio | G10L 25/48 |
| 9,749,021 B2* | 8/2017 | Gao | H04B 7/015 |
| 2005/0108004 A1 | 5/2005 | Otani et al. | |
| 2007/0232257 A1 | 10/2007 | Otani et al. | |
| 2008/0133225 A1* | 6/2008 | Yamada | G10L 15/1807 704/207 |
| 2009/0177468 A1* | 7/2009 | Yu | G10L 15/02 704/233 |
| 2010/0280833 A1* | 11/2010 | Yamanashi | G10L 21/038 704/500 |
| 2011/0035215 A1* | 2/2011 | Sompolinsky | G10L 15/02 704/231 |
| 2011/0125494 A1* | 5/2011 | Alves | G10L 21/0208 704/226 |
| 2011/0137644 A1* | 6/2011 | Nilsson | H04M 3/40 704/205 |
| 2011/0202339 A1* | 8/2011 | Emori | G10L 25/78 704/231 |

FOREIGN PATENT DOCUMENTS

| | | |
|---|---|---|
| CN | 102737480 A | 10/2012 |
| EP | 1280137 A1 | 1/2003 |
| JP | 2002-236494 A | 8/2002 |
| JP | 2004-272052 A | 9/2004 |
| JP | 2013-005418 A | 1/2013 |

OTHER PUBLICATIONS

International Search Report for PCT Application No. PCT/JP2014/058962, dated Jun. 17, 2014.
Masakiyo Fujimoto, "The Fundamentals and Recent Progress of Voice Activity Detection", the Institute of Electronics, Information and Communication Engineers, IEICE Technical Report SP2010-23, Jun. 2010. English Abstract.
Tsuneo Kato, Shingo Kuroiwa, Tohru Shimizu, and Norio Higuchi, "Tree-Based Clustering for Gaussian Mixture HMMs", IEICE Transactions on Fundamentals of Electronics, Communications and Computer Sciences D-II, vol. J83-D-II, No. 11, pp. 2128-2136, Nov. 2000.
Ken Hanazawa and Ryosuke Isotani, "Gender-Independent Speech Recognition by Look-Ahead Model Selection", Proceedings of the Acoustical Society of Japan, pp. 197-198, Sep. 2004.
Douglas A. Reynolds, Thomas F. Quatieri, Robert B. Dunn, "Speaker Verification Using Adapted Gaussian Mixture Models", Digital Signal Processing 10, 19-41 (2000).
Ming Li et al., "Automatic speaker age and gender recognition using acoustic and prosodic level information fusion", Computer Speech and Language., vol. 27, No. 1, Feb. 8, 2012, pp. 151-167, XP055310330.
Florian Metze et al., "Comparison of Four Approaches to Age and Gender Recognition for Telephone Applications", 2007 IEEE International Conference on Acoustics, Speech, and Signal Processing Apr. 15-20, 2007 Honolulu, HI, USA, Jan. 1, 2007, pp. IV-1089-IV-1092, XP055297509.
Extended European Search Report for EP Application No. EP14782146.6 dated Oct. 25, 2016.
Anonymous, "I0-Norm, I1-Norm, I2-Norm, . . . , I-infinity Norm", Book of Rorasa, Feb. 3, 2013 cited in EESR.
Extended European Search Report for EP Application No. EP14782146.6 dated on Feb. 15, 2018.
Shoji Hayakawa et al., "Speaker Recognition Using the Harmonic Structure of Linear Prediction Residual Spectrum", IEICE Transactions on Information and Systems, 1997, pp. 1360-1367, vol. J80-A, No. 9, cited in JPOA.
Japanese Office Action for JP Application No. 2015-511205 dated Mar. 20, 2018 with English Translation.
Chinese Office Action for CN Application No. 201480020787.6 dated Apr. 8, 2018 with English Translation.
Chinese Office Action for CN Application No. 201480020787.6 dated May 20, 2019 with English Translation.

* cited by examiner

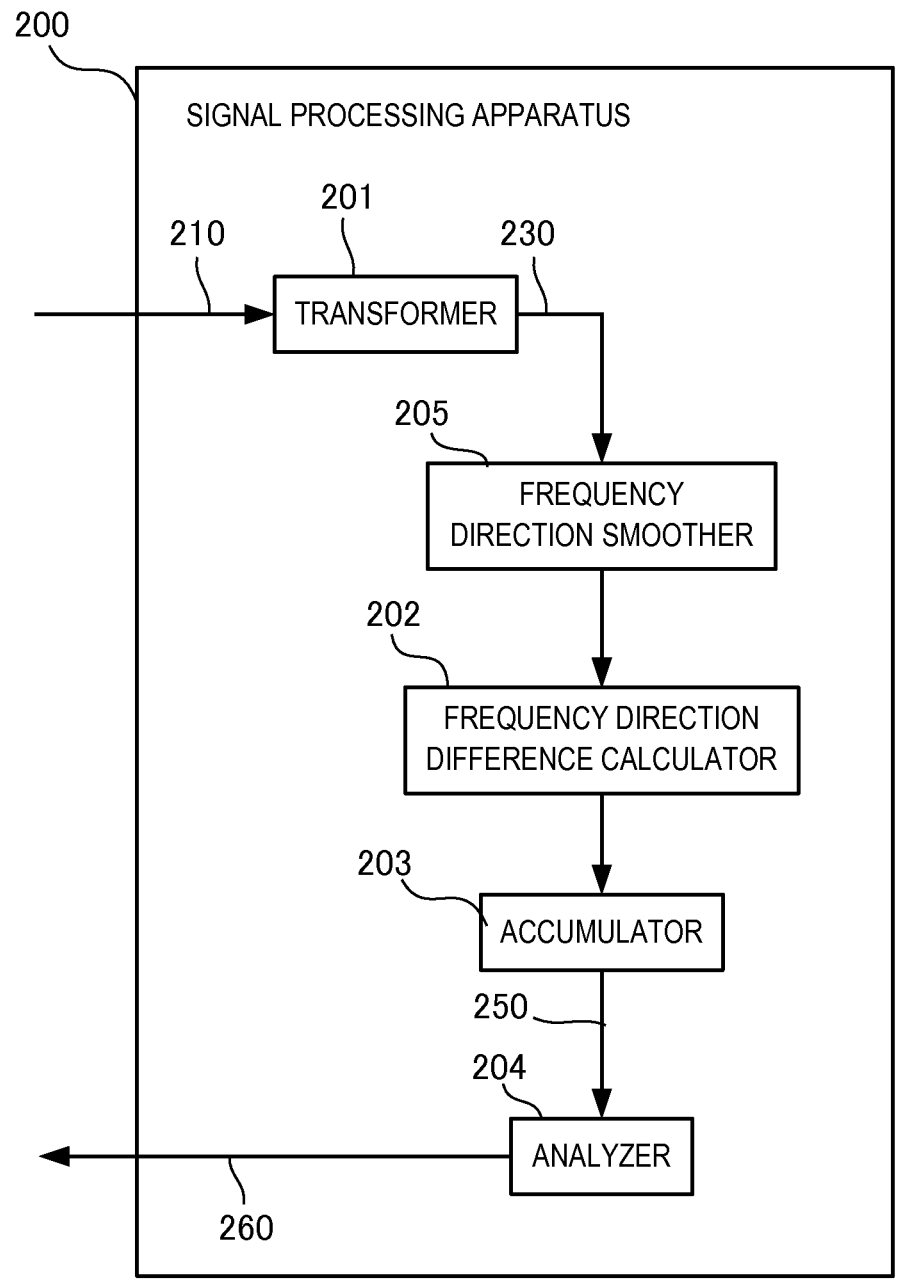
F I G. 2

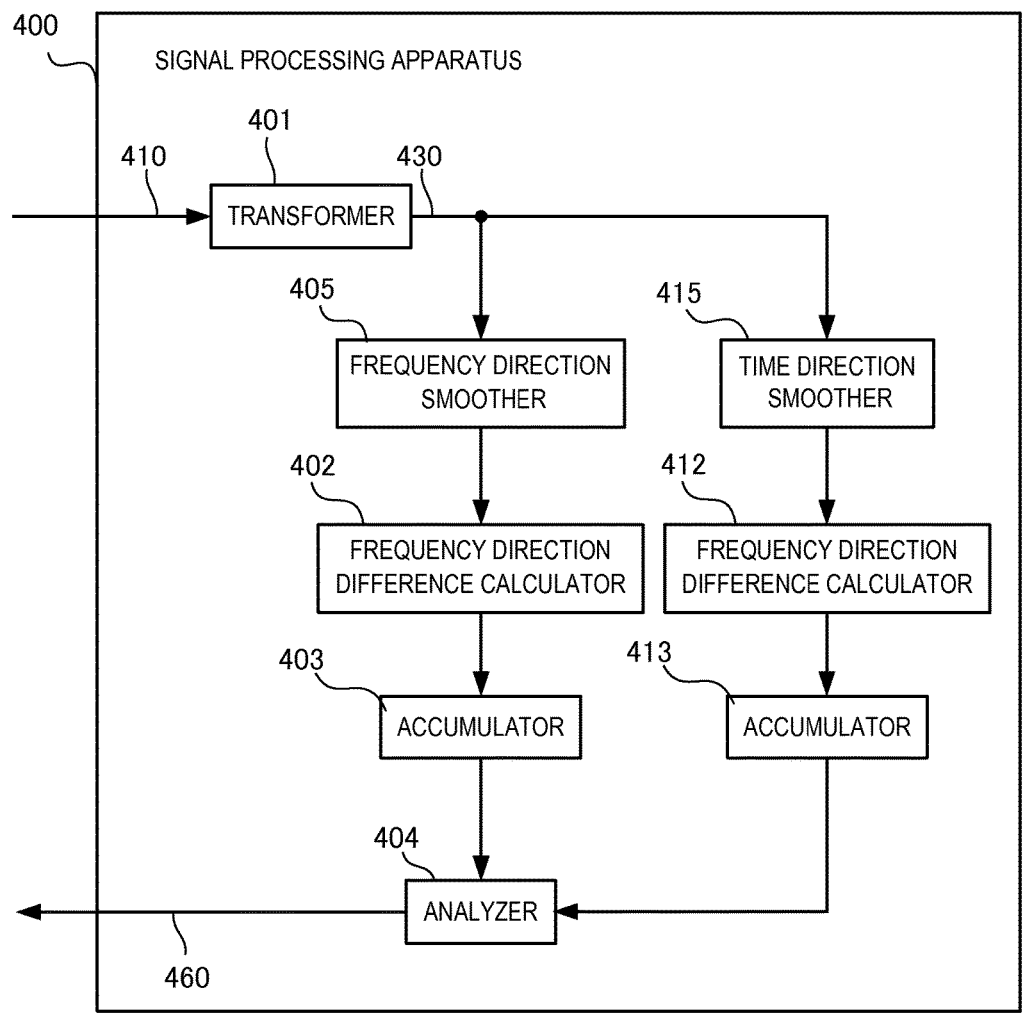
F I G. 4

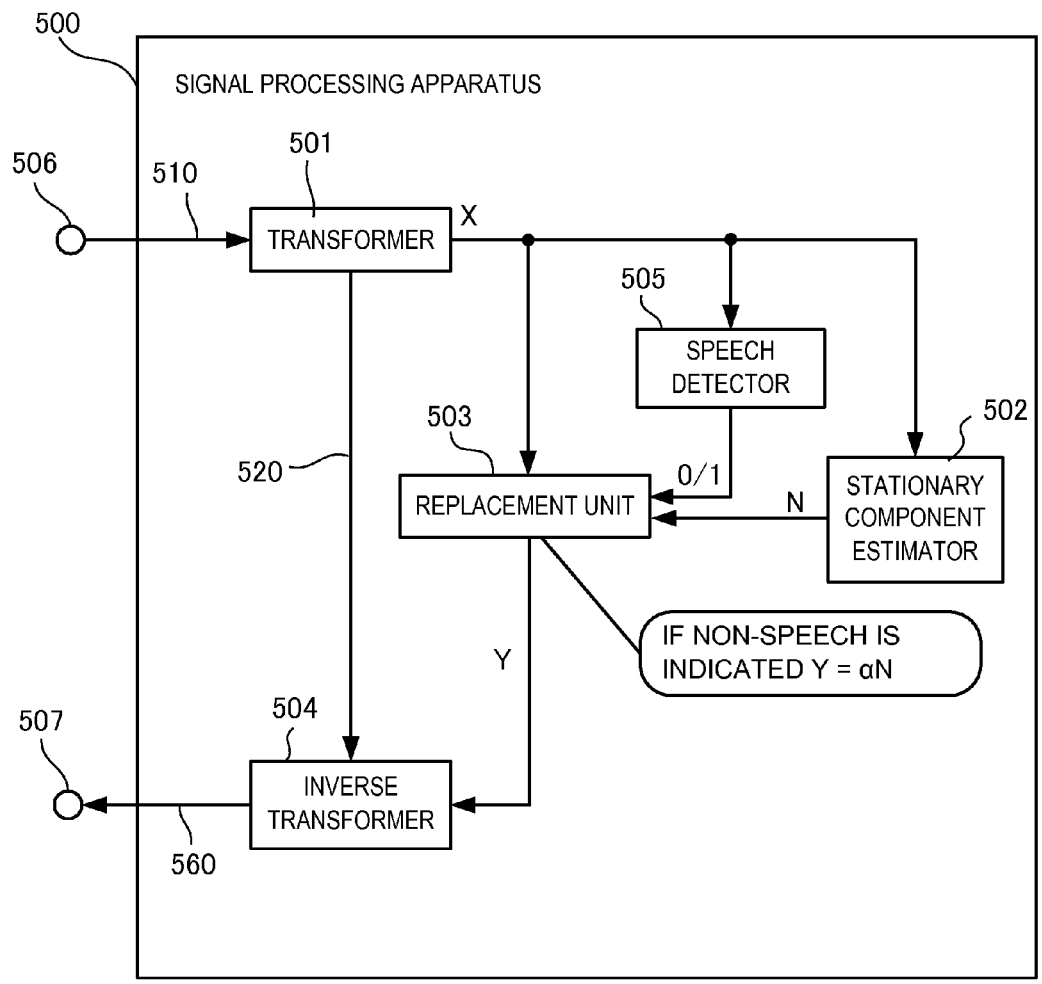
F I G. 5

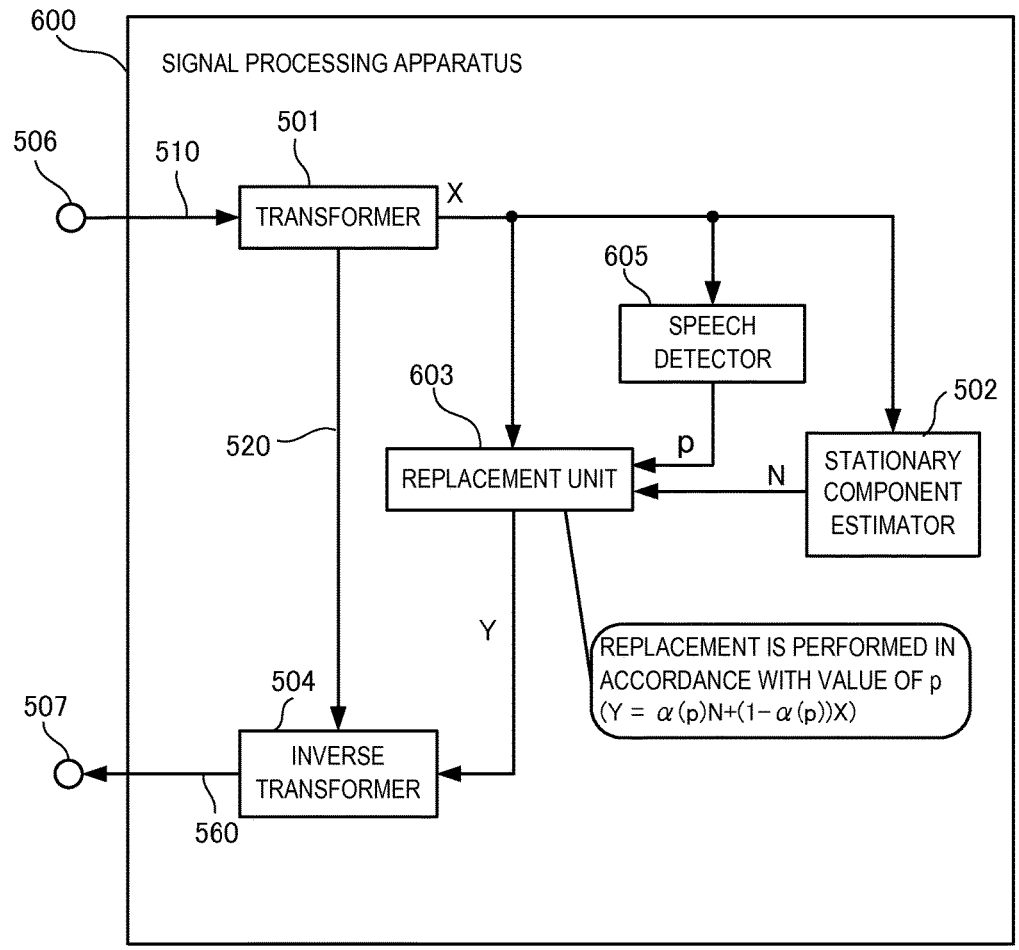
F I G. 6

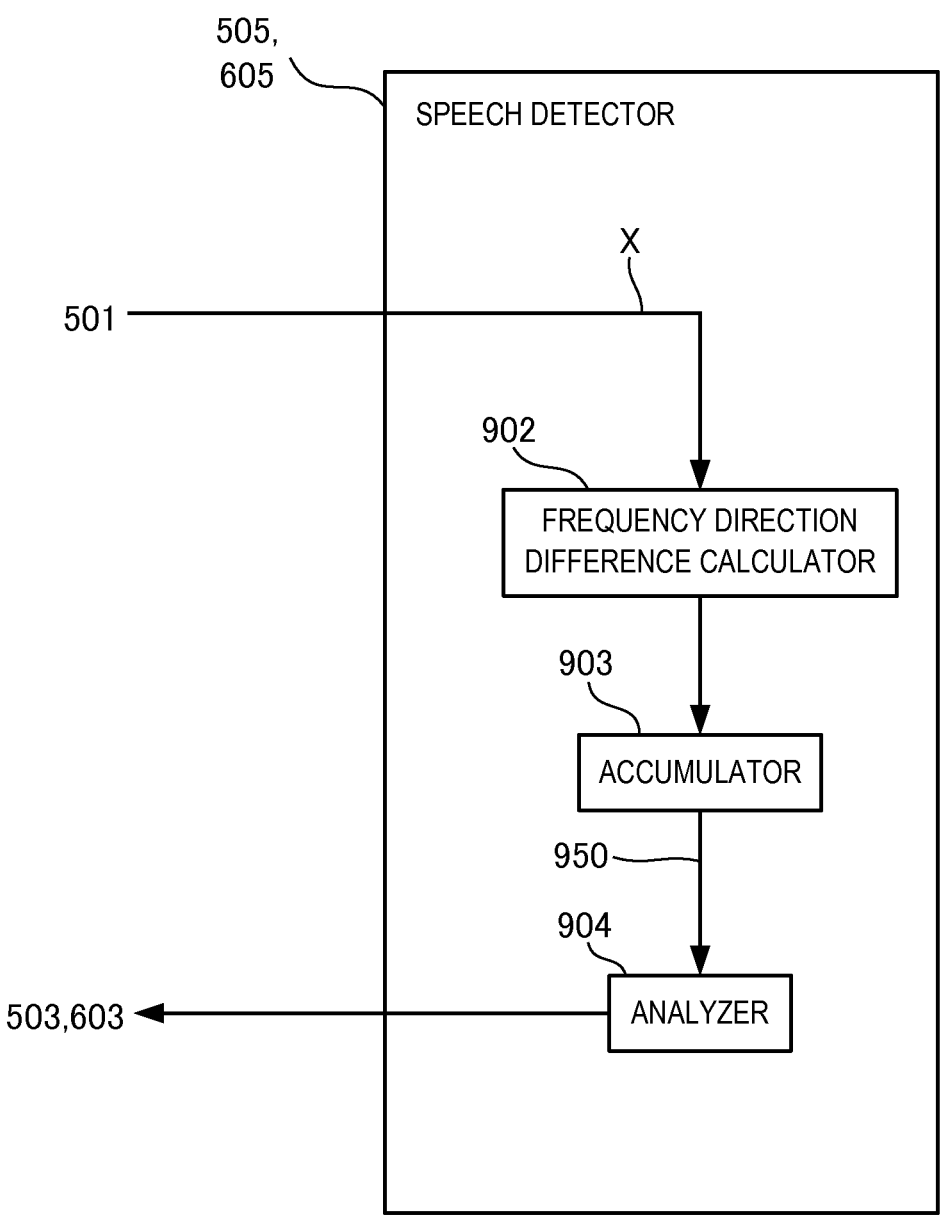
F I G. 9

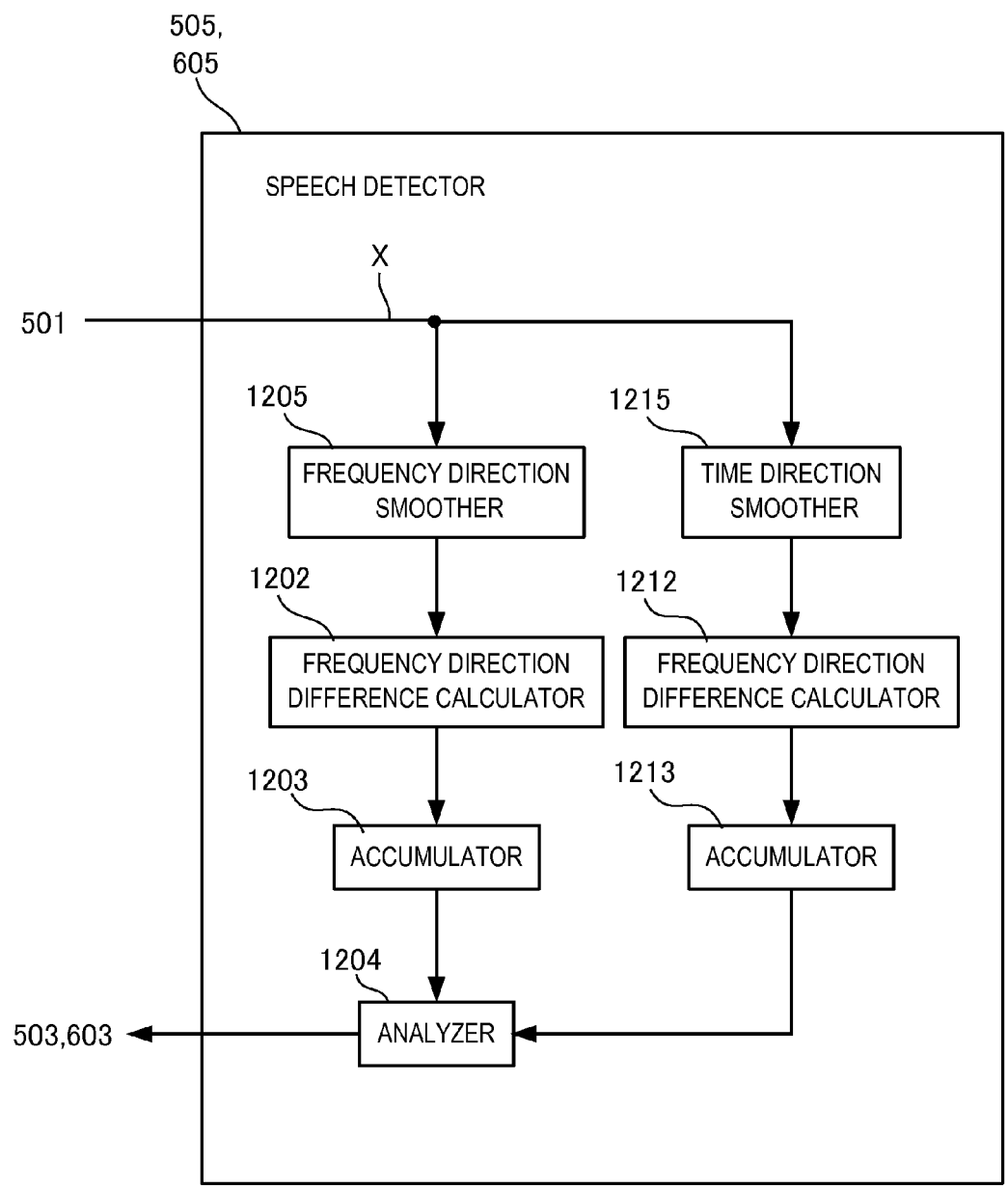
F I G. 12

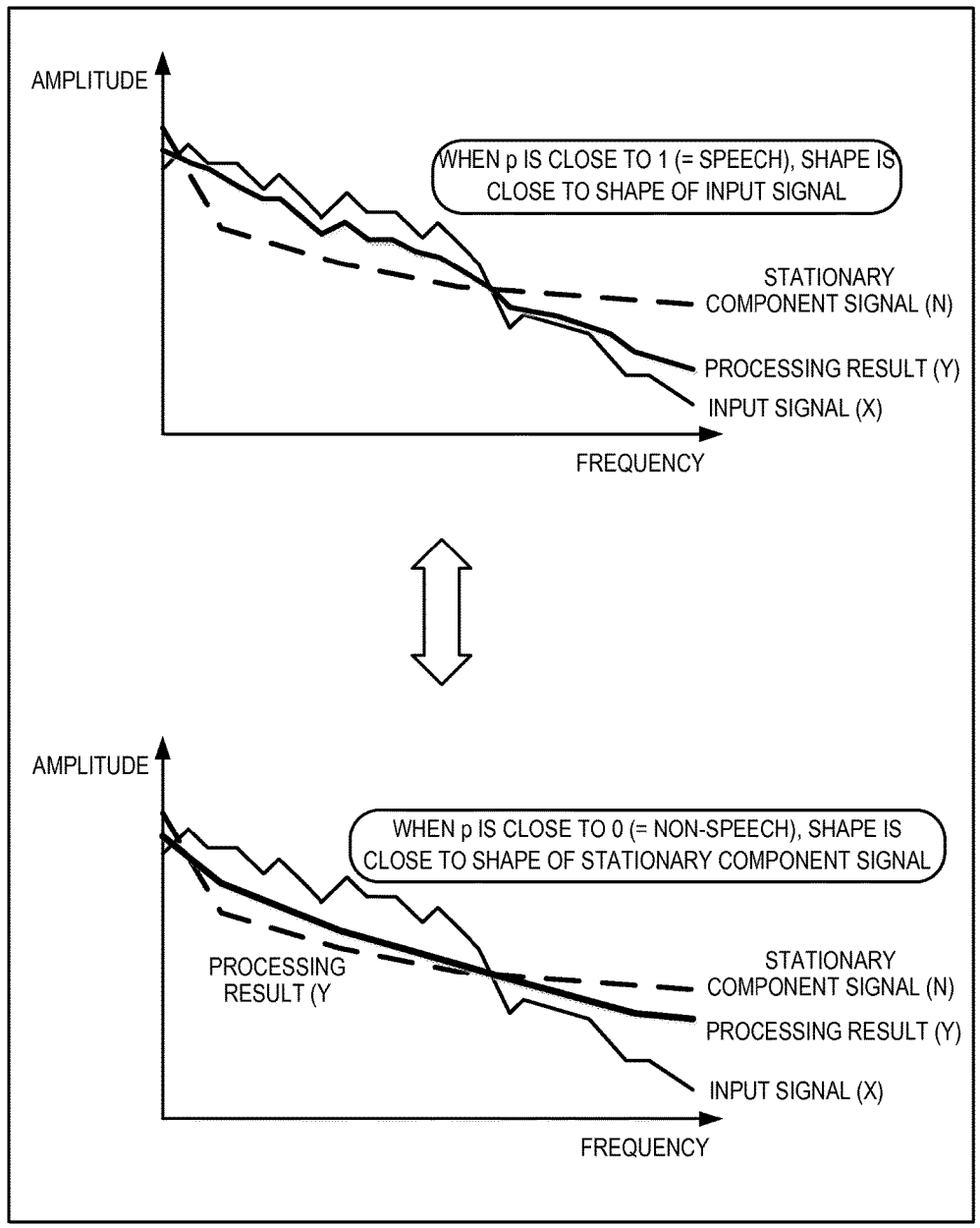
F I G. 14

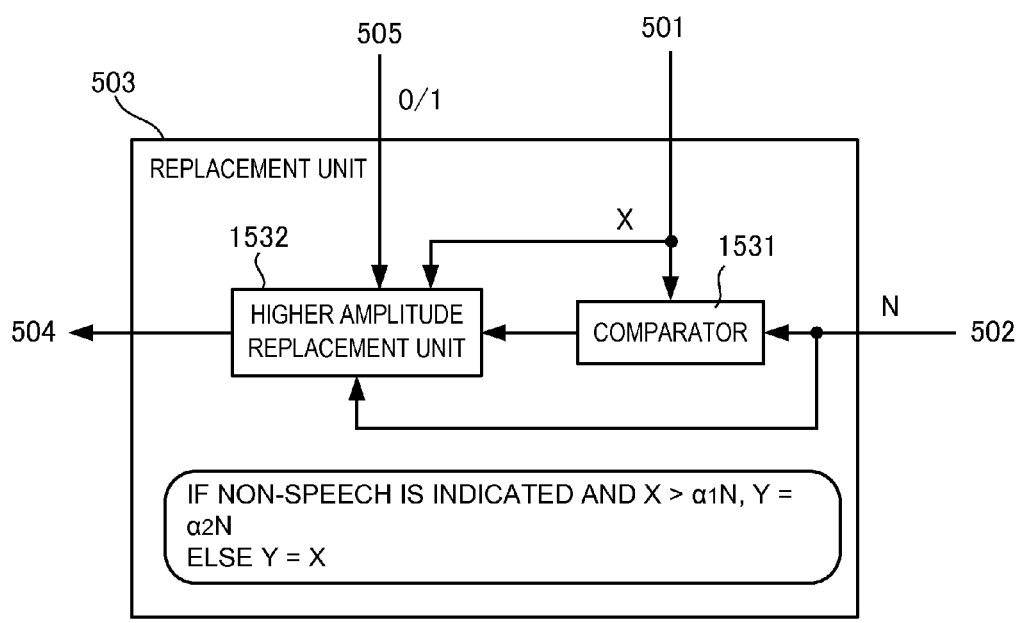
F I G. 15

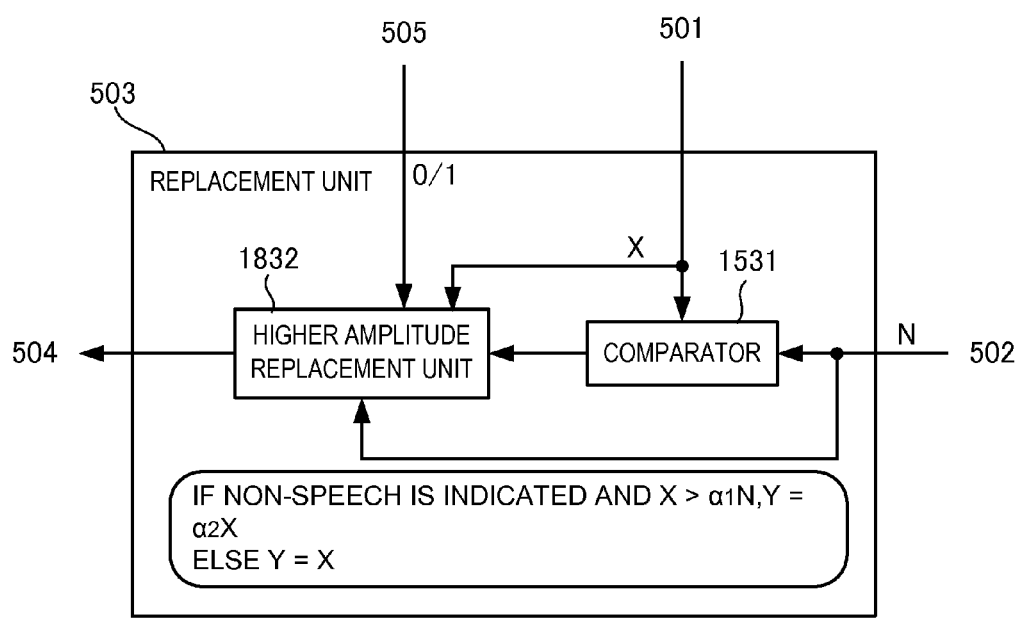
F I G. 18

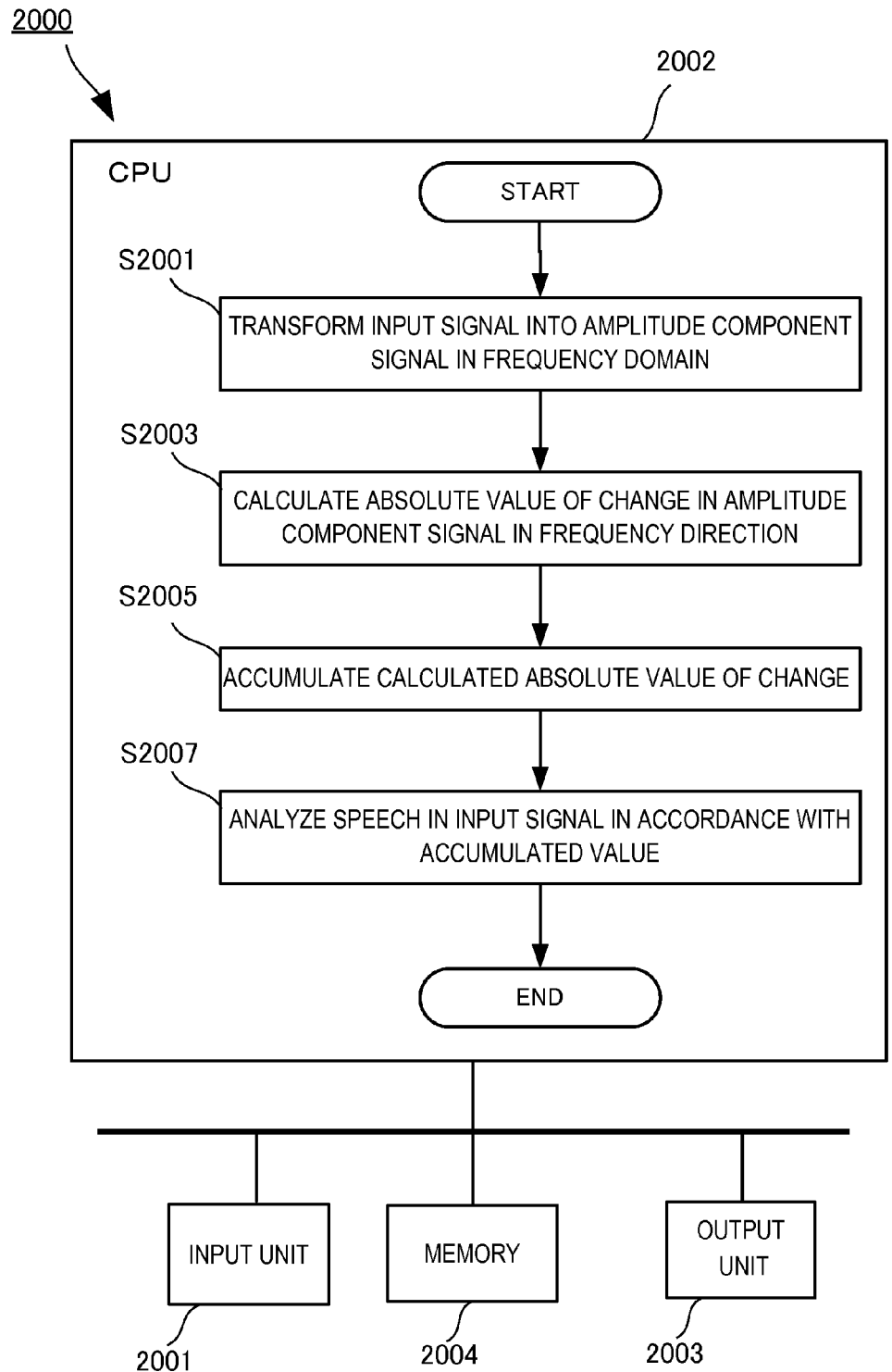
F I G. 20

SIGNAL PROCESSING APPARATUS, SIGNAL PROCESSING METHOD, SIGNAL PROCESSING PROGRAM

This application is a National Stage Entry of PCT/JP2014/058962 filed on Mar. 27, 2014, which claims priority from Japanese Patent Application 2013-083412 filed on Apr. 11, 2013, the contents of all of which are incorporated herein by reference, in their entirety.

TECHNICAL FIELD

The present invention relates to a technique of detecting a human voice in an input signal.

BACKGROUND ART

In the above technical field, patent literature 1 discloses a technique of detecting speech by determining the background noise level of an input speech frame, and comparing the volume of the input speech frame with a threshold corresponding to the noise level.

CITATION LIST

Patent Literature

Patent literature 1: Japanese Patent Laid-Open No. 2013-005418

Non-Patent Literature

Non-patent literature 1: Masakiyo Fujimoto, "The Fundamentals and Recent Progress of Voice Activity Detection", the Institute of Electronics, Information and Communication Engineers, IEICE Technical Report SP2010-23, June 2010

Non-patent literature 2: Tsuneo Kato, Shingo Kuroiwa, Tohru Shimizu, and Norio Higuchi, "Tree-Based Clustering for Gaussian Mixture HMMs", IEICE Transactions on Fundamentals of Electronics, Communications and Computer Sciences D-II, Vol. J83-D-II, No. 11, pp. 2128-2136, November 2000

Non-patent literature 3: Ken Hanazawa and Ryosuke Isotani, "Gender-Independent Speech Recognition by Look-Ahead Model Selection", Proceedings of the Acoustical Society of Japan, pp. 197-198, September 2004

Non-patent literature 4: "Speaker Verification Using Adapted Gaussian Mixture Models", Douglas A. Reynolds, Thomas F. Quatieri, Robert B. Dunn, Digital Signal Processing 10, 19-41 (2000)

SUMMARY OF THE INVENTION

Technical Problem

However, in the techniques described in the above literatures, the presence/absence of speech is simply determined by comparison of the volume, and thus if noise is large, no speech can be detected at all. Even if noise is small, the detection accuracy obtained by detecting speech by the volume is not sufficiently high.

The present invention enables to provide a technique of solving the above-described problem.

Solution to Problem

One aspect of the present invention provides a signal processing apparatus comprising:

a transformer that transforms an input signal into an amplitude component signal in a frequency domain;

a calculator that calculates a norm of a change in the amplitude component signal in a frequency direction;

an accumulator that accumulates the norm of the change calculated by the calculator; and an analyzer that analyzes a sound in the input signal in accordance with an accumulated value calculated by the accumulator.

Another aspect of the present invention provides a signal processing method comprising:

transforming an input signal into an amplitude component signal in a frequency domain;

calculating a norm of a change in the amplitude component signal in a frequency direction; and accumulating the norm of the change calculated in the calculating.

Still other aspect of the present invention provides a signal processing program for causing a computer to execute a method, comprising:

transforming an input signal into an amplitude component signal in a frequency domain;

calculating a norm of a change in the amplitude component signal in a frequency direction; and accumulating the norm of the change calculated in the calculating.

Advantageous Effects of Invention

According to the present invention, it is possible to improve the sound determination accuracy.

BRIEF DESCRIPTION OF DRAWINGS

FIG. 2 is block diagram showing the arrangement of a signal processing apparatus according to the second embodiment of the present invention;

FIG. 4 is block diagram showing the arrangement of a signal processing apparatus according to the fourth embodiment of the present invention;

FIG. 5 is block diagram showing an example of the arrangement of a signal processing apparatus according to the fifth embodiment of the present invention;

FIG. 6 is block diagram showing another example of the arrangement of the signal processing apparatus according to the fifth embodiment of the present invention;

FIG. 9 is a block diagram showing an example of the arrangement of a speech detector according to the fifth embodiment of the present invention;

FIG. 12 is a block diagram showing another example of the arrangement of the speech detector according to the fifth embodiment of the present invention;

FIG. 14 is a view showing a signal processing result by the signal processing apparatus according to the fifth embodiment of the present invention;

FIG. 15 is a block diagram showing the arrangement of a replacement unit according to the sixth embodiment of the present invention;

FIG. 18 is a block diagram showing the arrangement of a replacement unit according to the ninth embodiment of the present invention;

FIG. 20 is a block diagram showing an arrangement when a signal processing apparatus according to the embodiments of the present invention is implemented by software.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that "speech signal" in the following explanation indicates a direct electrical change that occurs in accordance with the influence of speech or another sound. The speech signal transmits speech or another sound and is not limited to speech.

[First Embodiment]

A signal processing apparatus 100 according to the first embodiment of the present invention will be described with reference to FIG. 1. The signal processing apparatus 100 is an apparatus for determining the existence of speech in an input signal.

Figure 1:
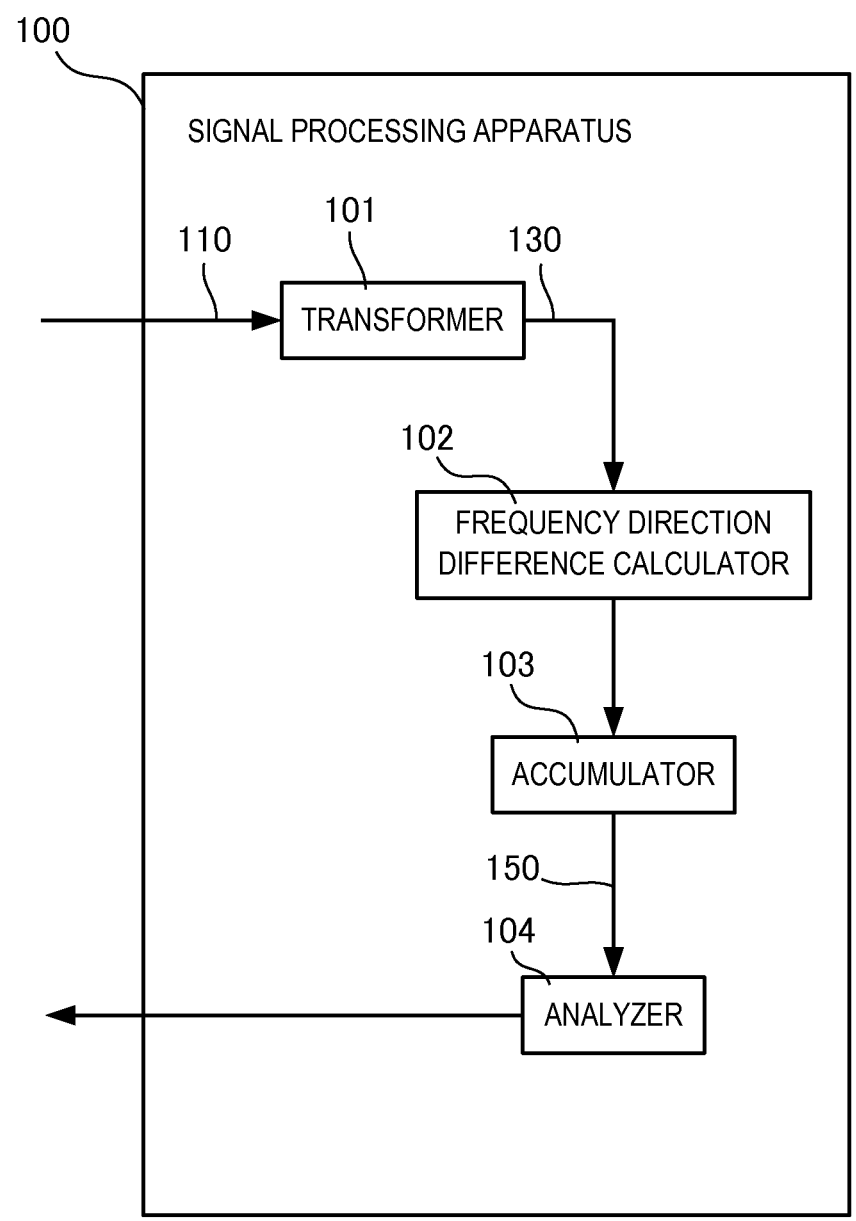
FIG. 1 is a block diagram showing the arrangement of a signal processing apparatus according to the first embodiment of the present invention.

As shown in FIG. 1, the signal processing apparatus 100 includes a transformer 101, a frequency direction difference calculator 102, an accumulator 103, and an analyzer 104. The transformer 101 transforms an input signal 110 into an amplitude component signal 130 in a frequency domain. The frequency direction difference calculator 102 calculates the norm of a change in the frequency direction difference calculator 102 in the frequency direction. The accumulator 103 accumulates the norm of the change calculated by the calculator 102. The analyzer 104 analyzes speech in the input signal 110 in accordance with an accumulated value 150 calculated by the accumulator 103.

With the above-described arrangement, it is possible to more correctly determine the possibility that speech exists in an input signal or the attribute of the speech.

This arrangement pays attention to the fact that speech largely changes in the frequency direction while noise is smooth in the frequency direction. For example, by using the accumulated value of the norm of a change in the frequency direction, it is determined that r exists at higher probability as the accumulated value is larger. Hard decision (0/1) may be performed by comparing the accumulated value with a threshold, or soft decision (0 to 256) may be performing by rounding the accumulated value itself.

[Second Embodiment]

A signal processing apparatus according to the second embodiment of the present invention will be described with reference to FIG. 2. FIG. 2 is a block diagram for explaining the functional arrangement of the signal processing apparatus according to this embodiment.

As shown in FIG. 2, a signal processing apparatus 200 includes a transformer 201, a frequency direction difference calculator 202, an accumulator 203, an analyzer 204, and a frequency direction smoother 205. The transformer 201 transforms an input signal 210 into an amplitude component signal 230 in the frequency domain. The frequency direction smoother 205 smoothes the amplitude component signal 230 in the frequency direction. The frequency direction difference calculator 202 calculates the norm of a change in the smoothed amplitude component signal 230 in the frequency direction. The accumulator 203 accumulates the norm of the change calculated by the frequency direction difference calculator 202. The analyzer 204 determines the existence of female speech or child speech based on an accumulated value 250 calculated by the accumulator 203. Note that the analyzer 204 may determine the existence of a scream.

With the above-described arrangement, whether female speech or child speech is mixed in the input signal 210 or the possibility that female speech or child speech is mixed in the input signal 210 is determined. This is useful when the user wants to determine whether a woman or child exists in a target space. For example, by incorporating such apparatus in an apparatus for detecting a child's tearful voice and generating an alert, it is possible to prevent a false alarm from being generated, and generate an alert more correctly.

This embodiment pays attention to the fact that female and child speech change more gradually than male speech. Since the amplitude component signal of male speech changes many times in the frequency direction, a smooth curve is obtained by performing smoothing in the frequency direction, resulting in a waveform similar to that of noise. This makes it possible to correctly extract female and child speech. The pitch of a scream is higher than usual, and thus the scream has a feature similar to female or child speech.

[Third Embodiment]

Figure 3:
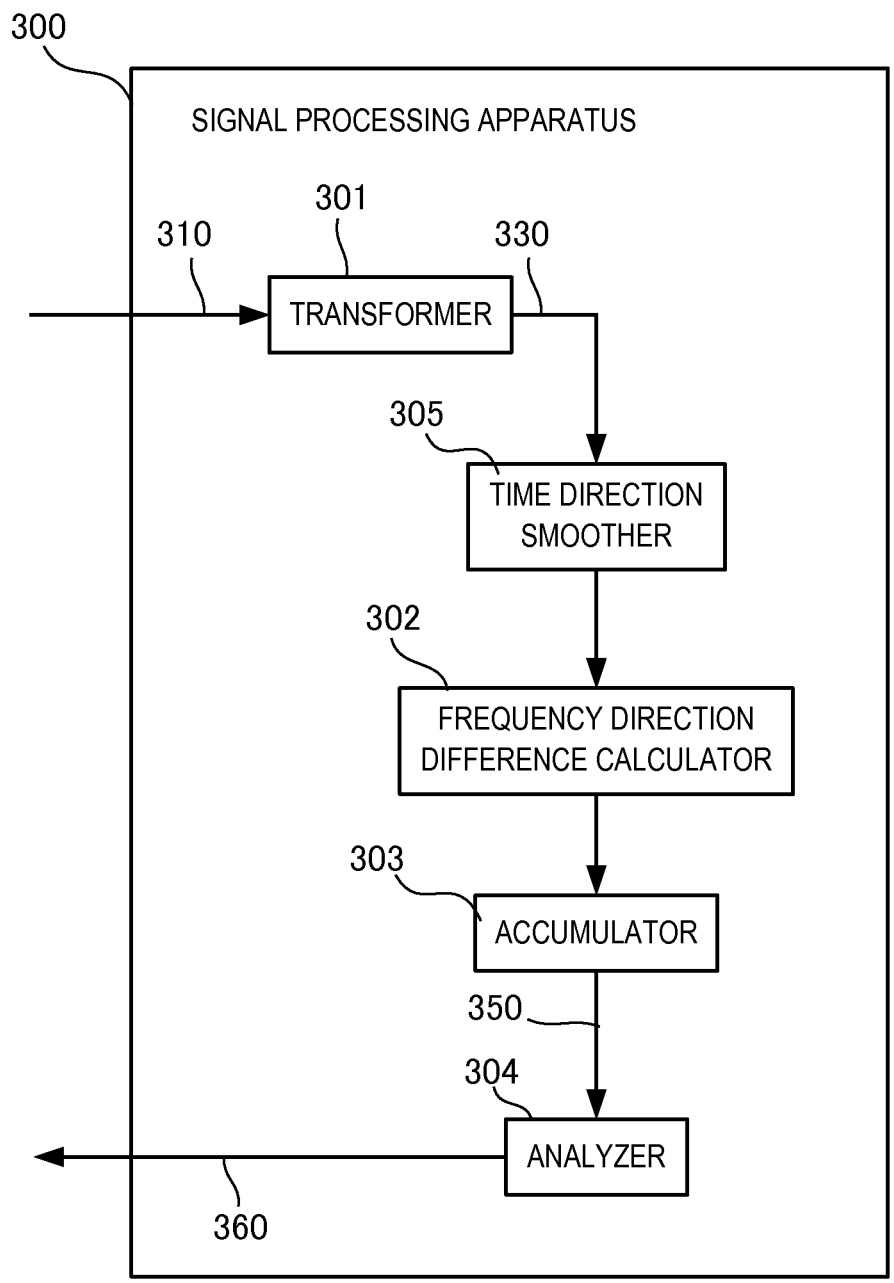
FIG. 3 is block diagram showing the arrangement of a signal processing apparatus according to the third embodiment of the present invention.

A signal processing apparatus according to the third embodiment of the present invention will be described with reference to FIG. 3. FIG. 3 is a block diagram for explaining the functional arrangement of the signal processing apparatus according to this embodiment.

As shown in FIG. 3, a signal processing apparatus 300 includes a transformer 301, a frequency direction difference calculator 302, an accumulator 303, an analyzer 304, and a time direction smoother 305. The transformer 301 transforms an input signal 310 into an amplitude component signal 330 in the frequency domain. The time direction smoother 305 smoothes the amplitude component signal 330 in a time direction. The frequency direction difference calculator 302 calculates the norm of a change in the smoothed amplitude component signal in the frequency direction. The accumulator 303 accumulates the norm of the change calculated by the frequency direction difference calculator 302. The analyzer 304 determines the existence of male speech based on an accumulated value 350 calculated by the accumulator 203.

With the above-described arrangement, whether male speech is mixed in the input signal 310 or the possibility that male speech is mixed in the input signal 310 is determined. This is useful when the user wants to determine whether a man exists in a target space. For example, by incorporating such apparatus in an apparatus for detecting intrusion of a man into a place closed to men such as a women's dormitory, and generating an alert, it is possible to prevent a false alarm from being generated, and generate an alert more correctly.

This embodiment pays attention to the fact that the amplitude component signal of male speech changes more times in the frequency direction than female and child speech. Since female and child speech change more gradually, a smooth curve is obtained by performing smoothing in the time direction, resulting in a waveform similar to that of noise. This makes it possible to correctly extract male speech.

[Fourth Embodiment]

A signal processing apparatus according to the fourth embodiment of the present invention will be described with reference to FIG. 4. FIG. 4 is a block diagram for explaining the functional arrangement of the signal processing apparatus according to this embodiment.

As shown in FIG. 4, a signal processing apparatus 400 includes a transformer 401, frequency direction difference calculators 402 and 412, accumulators 403 and 413, an analyzer 404, a frequency direction smoother 405, and a time direction smoother 415. The transformer 401 transforms an input signal 410 into an amplitude component signal 430 in the frequency domain. The frequency direction smoother 405 smoothes the amplitude component signal 430 in the frequency direction. The time direction smoother 415 smoothes the amplitude component signal 430 in the time direction. Each of the frequency direction difference calculators 402 and 412 calculates the norm of a change in the smoothed amplitude component signal in the frequency direction. Each of the accumulators 403 and 413 accumulates the norm of the change calculated by a corresponding one of the frequency direction difference calculators 402 and 412. The analyzer 404 determines the existence of male speech and the existence of female and child speech based on the accumulated values calculated by the accumulators 403 and 413.

With the above-described arrangement, whether male speech is mixed in the input signal 410, the possibility that male speech is mixed in the input signal 410, whether female and child speech are mixed in the input signal 410, or the possibility that female and child speech are mixed in the input signal 410 is determined. This apparatus is applicable to not only speech detection but also speaker identification, speech recognition, and the like. By determining whether to use a recognition dictionary for male speech or that for female and child speech in combination with a speech recognition technique and the like, it is possible to improve the recognition accuracy.

[Fifth Embodiment]

A signal processing apparatus according to the fifth embodiment of the present invention will be described next. The signal processing apparatus according to this embodiment, for example, appropriately suppresses non-stationary noise like wind blow noise. Simply speaking, in the frequency domain, a stationary component in an input sound is estimated, and part or all of the input sound is replaced by the estimated stationary component. The input sound is not limited to speech. For example, an environmental sound (noise on the street, the traveling sound of a train/car, an alarm/warning sound, a clap, or the like), a person's voice or animal's sound (chirping of a bird, barking of a dog, mewing of a cat, laughter, a tearful voice, a cheer, or the like), music, or the like may be used as an input sound. Note that speech is exemplified as a representative example of the input sound in this embodiment.

FIG. 5 is a block diagram showing the overall arrangement of a signal processing apparatus 500. A noisy signal (a signal including both a desired signal and noise) is supplied to an input terminal 506 as a series of sample values. The noisy signal supplied to the input terminal 506 undergoes transform such as Fourier transform in a transformer 501 and is divided into a plurality of frequency components. The plurality of frequency components are independently processed on a frequency basis. The description will be continued here by paying attention to a specific frequency component. Out of the frequency component, an amplitude spectrum (amplitude component) |X(k, n)| is supplied to a stationary component estimator 502, a replacement unit 503, and a speech detector 505, and a phase spectrum (phase component) 520 is supplied to an inverse transformer 504. Note that the transformer 501 supplies the noisy signal amplitude spectrum |X(k, n)| to the stationary component estimator 502, the replacement unit 503, and the speech detector 505 here. However, the present invention is not limited to this, and a power spectrum corresponding to the square of the amplitude spectrum may be supplied.

The stationary component estimator 502 estimates a stationary component included in the noisy signal amplitude spectrum |X(k, n)| supplied from the transformer 501, and generates a stationary component signal (stationary component spectrum) N(k, n).

The speech detector 505 determines, on a frequency basis, whether speech is included in the noisy signal amplitude spectrum |X(k, n)|. The replacement unit 503 replaces the noisy signal amplitude spectrum |X(k, n)| at a frequency at which no speech is included by using the stationary component spectrum N(k, n). For example, if the output of the speech detector 501 is 0 (no speech is included), Y(k, n)=α(k, n)N(k, n) is obtained. If the output of the speech detector 501 is 1 (speech is included), Y(k, n)=|X(k, n)| is obtained. The replacement unit 503 transmits the enhanced signal amplitude spectrum Y(k, n) to the inverse transformer 504 as a replacement result.

A function of obtaining an amplitude spectrum (replacement amplitude spectrum) used for replacement is not limited to a linear mapping function of N(k, n) represented by α(k, n)N(k, n). For example, a linear function such as α(k, n)N(k, n)+C(k, n) can be adopted. In this case, if C(k, n)>0, the level of the replacement amplitude spectrum can be improved as a whole, thereby improving the stationarity at the time of hearing. If C(k, n)<0, the level of the replacement amplitude spectrum can be decreased as a whole but it is necessary to adjust C(k, n) so a band in which the value of the spectrum becomes negative does not appear. In addition, the function of the stationary component spectrum N(k, n) represented in another form such as a high-order polynomial function or nonlinear function can be used.

The inverse transformer 504 performs inverse transform by compositing the noisy signal phase spectrum 520 supplied from the transformer 501 and the enhanced signal amplitude spectrum Y(k, n) supplied from the replacement unit 503, and supplies the resultant signal to an output terminal 507 as an enhanced signal.

According to this embodiment, since replacement is performed using the stationary component signal N(k, n) at a frequency except for that at which speech is included, it is possible to avoid a distortion of speech and the like caused by suppression.

FIG. 6 is a block diagram for explaining another example of the signal processing apparatus according to this embodiment. A signal processing apparatus 600 according to this embodiment is different from the signal processing apparatus 500 in that a speech detector 605 outputs a probability p(k, n) that speech is included in the noisy signal amplitude spectrum |X(k, n)| on a frequency basis where p(k, n) is a real number of 0 (inclusive) to 1 (inclusive). A replacement unit 603 performs replacement processing according to the speech presence probability p(k, n). The rest of the components and operations is the same as in FIG. 5. Hence, the same reference numerals denote the same components and operations, and a detailed description thereof will be omitted. The replacement unit 603 replaces the noisy signal amplitude spectrum |X(k, n)| using the speech presence probability p(k, n) and the stationary component signal N(k, n). By using, for example, a function α(p(k, n)) of p(k, n) ranging from 0 to 1, the output signal Y(k, n)=α(p(k, n))N(k, n)+(1−α(p(k, n)))|X(k, n)| may be obtained.

<<Arrangement of Transformer>>

Figure 7:
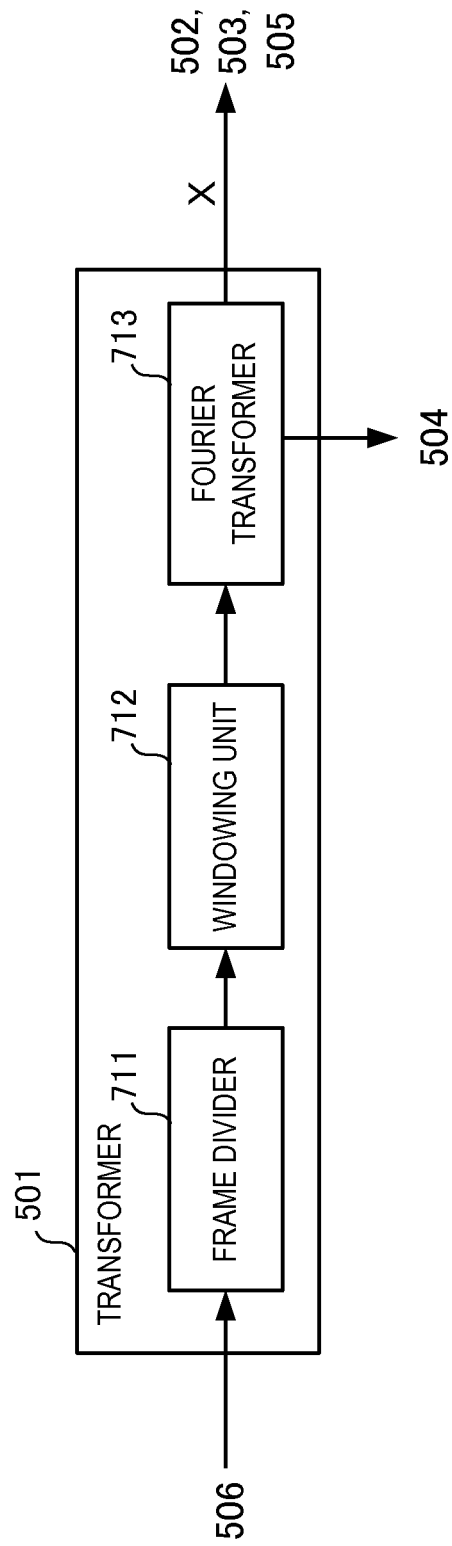
FIG. 7 is a block diagram showing the arrangement of a transformer according to the fifth embodiment of the present invention.

FIG. 7 is a block diagram showing the arrangement of the transformer 501. As shown in FIG. 7, the transformer 501 includes a frame divider 711, a windowing unit 712, and a Fourier transformer 713. A noisy signal sample is supplied to the frame divider 711 and divided into frames on the basis of K/2 samples, where K is an even number. The noisy signal sample divided into frames is supplied to the windowing unit 712 and multiplied by a window function w(t). The signal obtained by windowing an nth frame input signal x(t, n) (t=0, 1, . . . , K/2−1) by w(t) is given by $$\bar{x}(t,n)=w(t)x(t,n) \quad (1)$$

Two successive frames may partially be overlaid (overlapped) and windowed. Assume that the overlap length is 50% the frame length. For t=0, 1, . . . , K−1, the windowing unit 712 outputs the left-hand sides of $$\bar{x}(t, n) = \begin{cases} w(t)x(t, n-1), & 0 \le t < K/2 \\ w(t)x(t, n), & K/2 \le t < K \end{cases} \quad (2)$$

A symmetric window function is used for a real signal. The window function is designed to make the input signal and the output signal match with each other except a calculation error when the output of the transformer 501 is directly supplied to the inverse transformer 504. This means $w^2(t)+w^2(t+K/2)=1$.

The description will be continued below assuming an example in which windowing is performed for two successive frames that overlap 50%. As w(t), the windowing unit can use, for example, a Hanning window given by $$w(t) = \begin{cases} 0.5 + 0.5\cos\left(\frac{\pi(t - K/2)}{K/2}\right), & 0 \le t < K \\ 0, & \text{otherwise} \end{cases} \quad (3)$$

Various window functions such as a Hamming window and a triangle window are also known. The windowed output is supplied to the Fourier transformer 713 and transformed into the noisy signal spectrum |X(k, n)|. The noisy signal spectrum |X(k, n)| is separated into the phase and the amplitude. A noisy signal phase spectrum arg|X(k, n)| is supplied to the inverse transformer 504, whereas the noisy signal amplitude spectrum |X(k, n)| is supplied to the stationary component estimator 502 and the replacement unit 503. As already described, a power spectrum may be used in place of the amplitude spectrum.

<<Arrangement of Inverse Transformer>>

Figure 8:
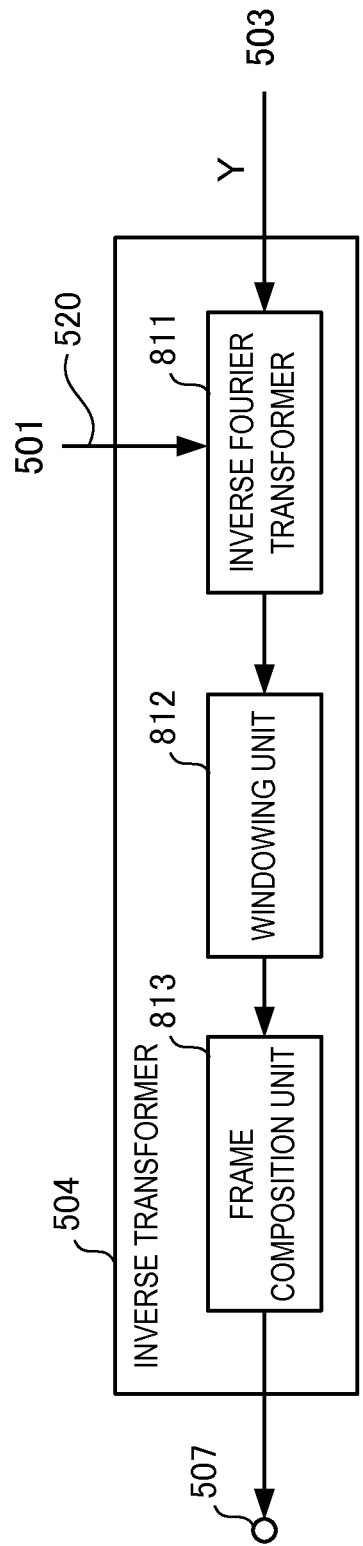
FIG. 8 is a block diagram showing the arrangement of an inverse transformer according to the fifth embodiment of the present invention.

FIG. 8 is a block diagram showing the arrangement of the inverse transformer 504. As shown in FIG. 8, the inverse transformer 504 includes an inverse Fourier transformer 811, a windowing unit 812, and a frame composition unit 813. The inverse Fourier transformer 811 obtains an enhanced signal spectrum (the left-hand side of equation (4) below) by multiplying an enhanced signal amplitude spectrum (|Y(k, n)|) (represented by Y in FIG. 8) supplied from the replacement unit 503 and the noisy signal phase spectrum 520 (arg|X(k, n)|) supplied from the transformer 501.

$$Y(k,n)=|Y(k,n)|\cdot\exp(j \arg X(k,n)) \quad (4)$$

where j represents an imaginary unit.

Inverse Fourier transform is performed for the obtained enhanced signal spectrum. The signal is supplied to the windowing unit 242 as a series of time domain sample values y(t, n) (t=0, 1, . . . , K−1) in which one frame includes K samples, and multiplied by the window function w(t). A signal obtained by windowing an nth frame enhanced signal y(t, n) (t=0, 1, . . . , K−1) by w(t) is given by the left-hand side of $$\bar{y}(t,n)=w(t)y(t,n) \quad (5)$$

The frame composition unit 813 extracts the outputs of two adjacent frames from the windowing unit 812 on the basis of K/2 samples, overlays them, and obtains an output signal (the left-hand side of equation (6)) for t=0, 1, . . . , K/2−1 by $$\hat{y}(t,n)=\bar{y}(t+K/2,n-1)+\bar{y}(t,n) \quad (6)$$

The obtained output signal is transmitted from the frame composition unit 813 to the output terminal 507.

Note that the transform in the transformer 501 and the inverse transformer 504 in FIGS. 7 and 8 has been described as Fourier transform. However, any other transform such as Hadamard transform, Haar transform, or Wavelet transform may be used in place of the Fourier transform. Haar transform does not need multiplication and can reduce the area of an LSI chip. Wavelet transform can change the time resolution depending on the frequency and is therefore expected to improve the noise suppression effect.

The stationary component estimator 502 can estimate a stationary component after a plurality of frequency components obtained by the transformer 501 are integrated. The number of frequency components after integration is smaller than that before integration. More specifically, a stationary component spectrum common to an integrated frequency component obtained by integrating frequency components is obtained and commonly used for the individual frequency components belonging to the same integrated frequency component. As described above, when a stationary component signal is estimated after a plurality of frequency components are integrated, the number of frequency components to be applied becomes small, thereby reducing the total calculation amount.

(Definition of Stationary Component Spectrum)

The stationary component spectrum indicates a stationary component included in the input signal amplitude spectrum. A temporal change in power of the stationary component is smaller than that of the input signal. The temporal change is generally calculated by a difference or ratio. If the temporal change is calculated by a difference, when an input signal amplitude spectrum and a stationary component spectrum are compared with each other in a given frame n, there is at least one frequency k which satisfies $$(|N(k,n-1)|-|N(k,n)|)^2<(|X(k,n-1)|-|X(k,n)|)^2 \quad (7)$$

Alternatively, if the temporal change is calculated by a ratio, there is at least one frequency k which satisfies $$\frac{|N(k, n-1)|}{|N(k, n)|} < \frac{|X(k, n-1)|}{|X(k, n)|} \quad (8)$$

That is, if the left-hand side of the above expression is always larger than the right-hand side for all the frames n and frequencies k, it can be defined that N(k, n) is not a stationary component spectrum. Even if the functions are the indices, logarithms, or powers of X and N, the same definition can be given.

(Method of Deriving Stationary Component Spectrum)

Various estimation methods such as the methods described in non-patent literatures 1 and 2 can be used to estimate the stationary component spectrum N(k, n) in the stationary component estimator 502.

For example, non-patent literature 1 discloses a method of obtaining, as an estimated noise spectrum, the average value of noisy signal amplitude spectra of frames in which no target sound is generated. In this method, it is necessary to detect generation of the target sound. A section where the target sound is generated can be determined by the power of the enhanced signal.

As an ideal operation state, the enhanced signal is the target sound other than noise. In addition, the level of the target sound or noise does not largely change between adjacent frames. For these reasons, the enhanced signal level of an immediately preceding frame is used as an index to determine a noise section. If the enhanced signal level of the immediately preceding frame is equal to or smaller than a predetermined value, the current frame is determined as a noise section. A noise spectrum can be estimated by averaging the noisy signal amplitude spectra of frames determined as a noise section.

Non-patent literature 1 also discloses a method of obtaining, as an estimated noise spectrum, the average value of noisy signal amplitude spectra in the early stage in which supply of them has started. In this case, it is necessary to meet a condition that the target sound is not included immediately after the start of estimation. If the condition is met, the noisy signal amplitude spectrum in the early stage of estimation can be obtained as the estimated noise spectrum.

Non-patent literature 2 discloses a method of obtaining an estimated noise spectrum from the minimum value (minimum statistic) of the noisy signal amplitude spectrum. In this method, the minimum value of the noisy signal amplitude spectrum within a predetermined time is held, and a noise spectrum is estimated from the minimum value. The minimum value of the noisy signal amplitude spectrum is similar to the shape of a noise spectrum and can therefore be used as the estimated value of the noise spectrum shape. However, the minimum value is smaller than the original noise level. Hence, a spectrum obtained by appropriately amplifying the minimum value is used as an estimated noise spectrum.

In addition, an estimated noise spectrum may be obtained using a median filter. An estimated noise spectrum may be obtained by WiNE (Weighted Noise Estimation) as a noise estimation method of following changing noise by using the characteristic in which noise slowly changes.

The thus obtained estimated noise spectrum can be used as a stationary component spectrum.

(Arrangement of Example of Speech Detector)

FIG. 9 is a block diagram showing the arrangement of an example of the speech detector 505 or 605. The speech detector 505 or 605 includes a frequency direction difference calculator 902, an accumulator 903, and an analyzer 904. The frequency direction difference calculator 902 calculates the norm of a change in the amplitude component signal in the frequency direction. The change in the frequency direction mainly indicates the difference or ratio between adjacent frequency components. For example, if the change is defined as a difference, when the amplitude component signal is represented by |X(k, n)| (where k represents a frequency number and n represents a frame number), a norm D(k, n) of the change in the frequency direction is calculated by D(k, n)=Lm(|X(k−1, n)|−|X(k, n)|) where Lm(·) represents an Lm-norm. m may be 1, 2, or infinity. For L1-norm, D(k, n) can be calculated as the absolute value of the difference, that is, D(k, n)=||X(k−1, n)|−|X(k, n)||.

For L2-norm, D(k, n) can be calculated as the square root of the square of the difference, that is, D(k, n)=√(|X(k−1, n)|−|X(k, n)|)². Alternatively, the norm of a logarithmic difference may be calculated by D(k, n)=Lm(log 10(|X(k−1, n)|)−log 10(|X(k, n)|)).

The range of k may be limited for the purpose of reducing the calculation amount. In this case, since the amplitude component of speech components mainly exists in the low band, a small value, that is, a value belonging to the low band is preferably adopted for k. In addition, when the number of frequency bins is large, the difference between k−1 and k+1 or between k−2 and k may be calculated instead of the difference between k−1 and k.

The accumulator 903 accumulates the norm of the change calculated by the frequency direction difference calculator 902. The analyzer 904 of the speech detector 505 determines the presence/absence (0/1) of speech in the noisy amplitude component signal |X(k, n)| by comparing an accumulated value 950 calculated by the accumulator 903 with a threshold stored in advance. On the other hand, the analyzer 904 of the speech detector 605 rounds the accumulated value 950 calculated by the accumulator 903 to output the speech presence probability p(k, n) in the noisy amplitude component signal |X(k, n)|. At this time, the analyzer 904 may determine the existence of a voice of a specific person by comparing the accumulated value with an accumulated value which is stored in advance and is associated with the voice of the specific person.

(Spectrum Shape in Example of Speech Detector)

Figure 10:
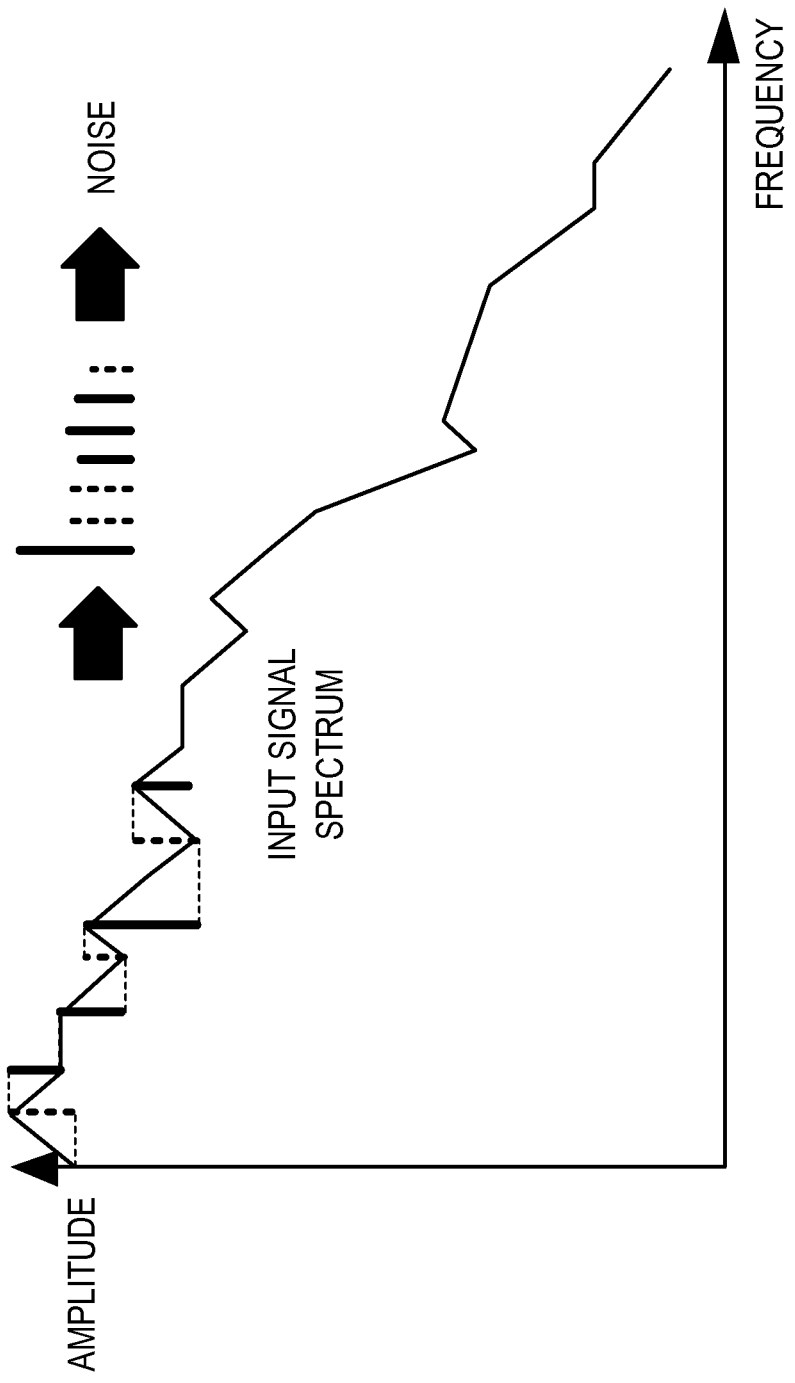
FIG. 10 is a graph for explaining an example of the speech detector according to the fifth embodiment of the present invention.
Figure 11:
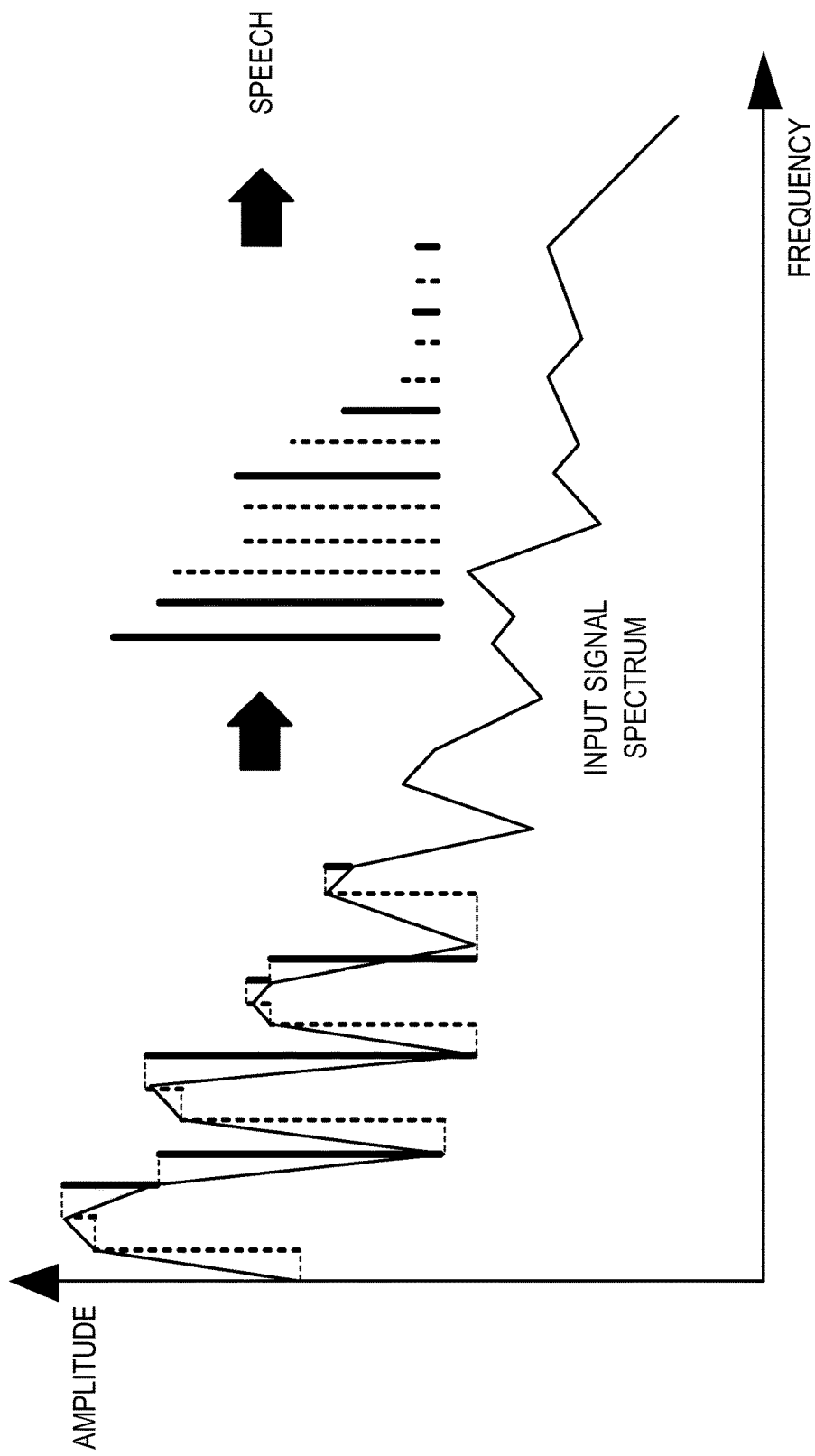
FIG. 11 is a graph for explaining the example of the speech detector according to the fifth embodiment of the present invention.

FIGS. 10 and 11 are graphs each showing the noisy signal amplitude spectrum (input signal spectrum) |X(k, n)| at given time n. As shown in FIG. 10, when the sum of the norms of the amplitude differences between adjacent frequencies is small, noise is determined. On the other hand, as shown in FIG. 11, when the sum of the norms of the amplitude differences between adjacent frequencies is large, speech (desired speech or target speech) is determined.

(Arrangement of Another Example of Voice Detector)

FIG. 12 is a block diagram showing the arrangement of another example of the speech detector 505 or 605. In this example, the speech detector 505 or 605 includes frequency direction difference calculators 1202 and 1212, accumulators 1203 and 1213, an analyzer 1204, a frequency direction smoother 1205, and a time direction smoother 1215. The frequency direction smoother 1205 smoothes the noisy amplitude component signal |X(k, n)| in the frequency direction.

Representative examples of smoothing are a moving average and linear leaky integration. If a moving average is adopted as a smoother, when |X(k, n)| represents the amplitude component signal, a smoothed amplitude component signal |X(k, n)|$_{bar}$ is calculated by $$|X(k, n)|_{bar} = \frac{1}{7} \sum_{p=-3}^{3} |x(k + p, n)|$$

Alternatively, if linear leaky integration is adopted, |X(k, n)|$_{bar}$ is calculated by |X(k, n)|$_{bar}$=0.8|X(k−1, n)|$_{bar}$+0.2|X(k, n)|. In addition, a low-pass filter, median filter, or ε filter may be used for smoothing.

The time direction smoother 1215 smoothes the noisy amplitude component signal |X(k, n)| in the time direction. Each of the frequency direction difference calculators 1202 and 1212 calculates the norm of a change in the smoothed amplitude component signal in the frequency direction. Each of the accumulators 1203 and 1213 accumulates the norm of the change calculated by a corresponding one of the frequency direction difference calculators 1202 and 1212. The analyzer 1204 determines the existence of male speech and the existence of female and child speech based on the accumulated values calculated by the accumulators 1203 and 1213. That is, the analyzer 1204 of the speech detector 505 determines the presence/absence (0/1) of speech in the noisy amplitude component signal |X(k, n)| by comparing the accumulated value calculated by the accumulator 1203 with a threshold stored in advance, and comparing the accumulated value calculated by the accumulator 1213 with another threshold stored in advance. On the other hand, the analyzer 1204 of the speech detector 605 adds the accumulated value calculated by the accumulator 1203 and that calculated by the accumulator 1213, rounds the resultant value, and outputs the speech presence probability p(k, n) in the noisy amplitude component signal |X(k, n)|. At this time, the analyzer 1204 may determine the existence of a voice of a specific person by comparing the accumulated value with an accumulated value which is stored in advance and is associated with specific male or female speech.

(Spectrum Shape in Another Example of Speech Detector)

Figure 13:
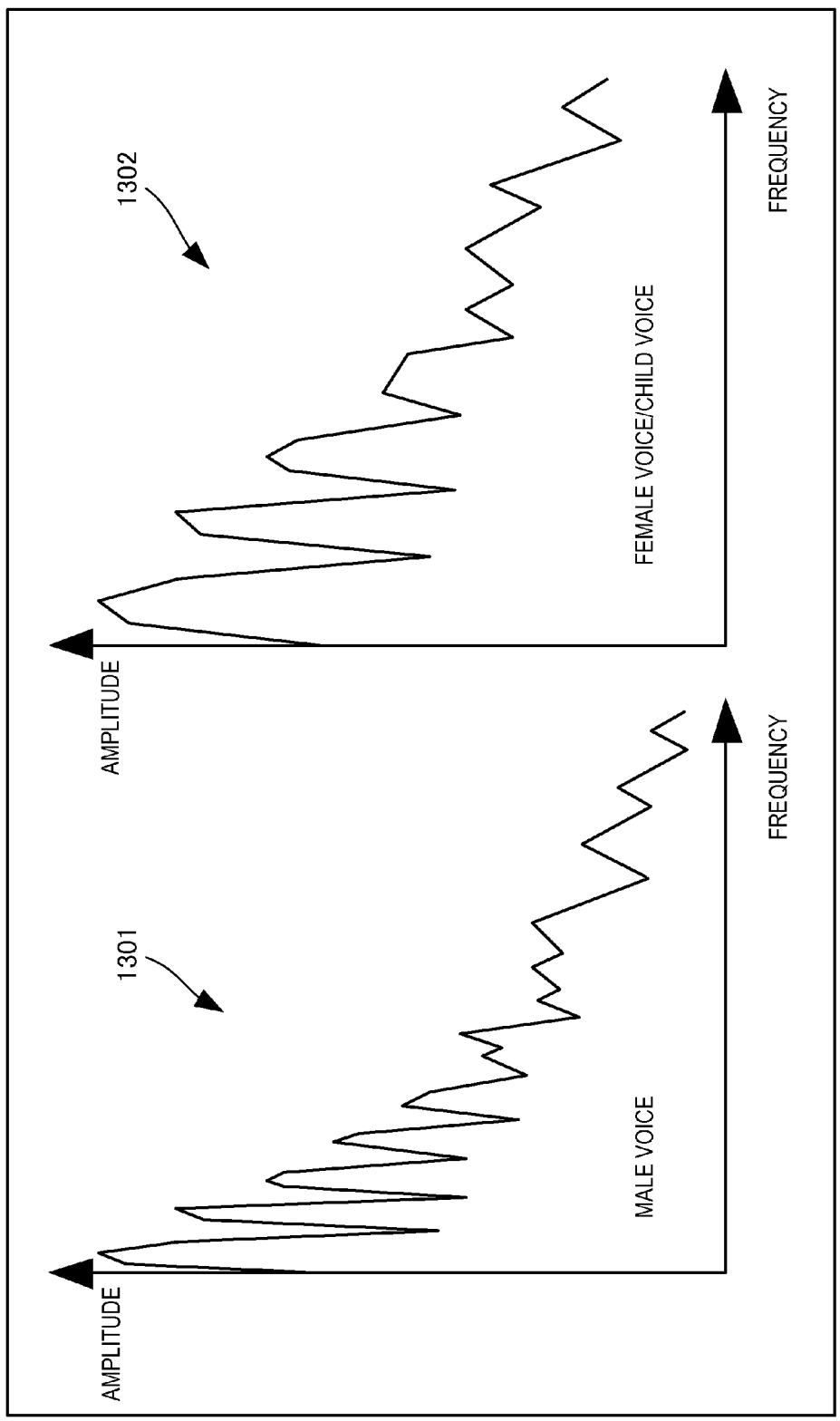
FIG. 13 is a view for explaining another example of the speech detector according to the fifth embodiment of the present invention.

FIG. 13 is a view for explaining a difference in spectrum shape depending on a gender. As will be apparent by comparing graphs 1301 and 1302, female and child speech change more gradually than male speech. Since the amplitude component signal of male speech changes many times in the frequency direction, a smooth curve is obtained by performing smoothing in the frequency direction, resulting in a waveform similar to that of noise. That is, it is possible to correctly extract female and child speech by using the frequency direction smoother 1205. On the other hand, since female and child speech gradually change, a smooth curve is obtained by performing smoothing in the time direction, resulting in a waveform similar to that of noise. That is, it is possible to correctly extract male speech by using the time direction smoother 1215.

(Spectrum Shape)

FIG. 14 is a view showing a change in spectrum shape of the output signal |Y(k, n)| in accordance with the value of p(k, n). A graph in the upper portion of FIG. 14 shows a case in which p(k, n) is close to 1 (=speech), and the processing result Y(k, n) has a spectrum shape closer to that of the input signal |X(k, n)|. On the other hand, a graph in the lower portion of FIG. 14 shows a case in which p(k, n) is close to 0 (=non-speech), and the processing result Y(k, n) has a spectrum shape closer to that of the stationary component signal N(k, n).

(Coefficient α)

An empirically appropriate value is determined as the coefficient α(k, n) by which the stationary component signal N(k, n) is multiplied in the replacement unit 503 shown in FIG. 5. For example, if α(k, n)=1, Y(k, n)=N(k, n) is obtained, and thus the stationary component signal N(k, n) is directly used as an output signal to the inverse transformer 504. At this time, if the stationary component signal N(k, n) is large, large noise unwantedly remains. To solve this problem, the coefficient α(k, n) may be determined so that the maximum value of the amplitude component signal to be output to the inverse transformer 504 is equal to or smaller than a predetermined value. For example, if α(k, n)=0.5, replacement is performed by a signal of half the power of the stationary component signal. If α(k, n)=0.1, the sound becomes small, and has the same spectrum shape as that of the stationary component signal N(k, n).

For example, if an SNR (signal-to-noise ratio) is high, a sound is small, and thus strong suppression may be performed by decreasing α(k, n). To the contrary, when the SNR is high, noise is small, and thus no replacement may be performed by setting α(k, n) to 1. In addition, by considering that a sound is unpleasant when the high band is enhanced, a function of making α(k, n) sufficiently small when k is equal to or larger than a threshold, or a monotonically decreasing function of k, which becomes smaller as k increases, may be used.

According to this embodiment, it is possible to make noise stationary in accordance with the speech presence possibility, and suppress non-stationary noise like wind blow noise while effectively avoiding a distortion of speech and the like. Note that the replacement unit 503 may replace an amplitude component on a sub-band basis in place of a frequency basis.

[Sixth Embodiment]

A signal processing apparatus according to the sixth embodiment of the present invention will be described with reference to FIG. 15. FIG. 15 is a block diagram for explaining the arrangement of a replacement unit 503 of the signal processing apparatus according to this embodiment. The replacement unit 503 according to this embodiment is different from the fifth embodiment in that a comparator 1531 and a larger amplitude replacement unit 1532 are included. The rest of the components and operations is the same as in the fifth embodiment. Hence, the same reference numerals denote the same components and operations, and a detailed description thereof will be omitted.

The comparator 1531 compares a noisy signal amplitude spectrum |X(k, n)| with a first threshold obtained by calculating a stationary component spectrum N(k, n) by a linear mapping function as the first function. In this embodiment, a case in which comparison is performed with a representative constant multiple among linear mapping functions, that is, a multiple of α1(k, n) will be explained. The larger amplitude replacement unit 1532 receives a speech presence/absence signal (0/1) from a speech detector 505. If the signal indicates non-speech and |X(k, n)|>α1(k, n)N(k, n), |Y(k, n)|=α2N(k, n) is obtained; otherwise, |Y(k, n)|=|X(k, n)| is obtained. That is, if the amplitude (power) component |X(k, n)| is larger than a multiple of α1(k, n) of the stationary component signal N(k, n) in a non-speech section, the larger amplitude replacement unit 1532 performs replacement by a multiple of α2 of the stationary component signal |N(k, n)|; otherwise, the spectrum shape is directly used as the output signal |Y(k, n)| of the replacement unit 503.

A method of calculating a spectrum to be used for comparison with the noisy signal amplitude spectrum |X(k, n)| is not limited to the method using the linear mapping function of the stationary component spectrum N(k, n). For example, a linear function like α1(k, n)N(k, n)+C(k, n) can be adopted. In this case, if C(k, n)<0, a band where replacement is performed by the stationary component signal increases, and it is thus possible to largely suppress unpleasant non-stationary noise. In addition, the function of the stationary component spectrum N(k, n) represented in another form such as a high-order polynomial function or nonlinear function can be used.

This is effective when a variation in input signal is large in a frequency band in which power is larger than the threshold α1(k, n)N(k, n) obtained by multiplying the stationary component signal by the predetermined coefficient. On the other hand, since it is possible to maintain the naturalness in a band in which power is smaller than the threshold α1(k, n)N(k, n) obtained by multiplying the stationary component signal by the predetermined coefficient, the sound quality improves.

At each time, α2(k, n) can be obtained according to a procedure of (1)→(2) below.

(1) A short-time moving average X_bar(k, n) (k and n are indices corresponding to the frequency and time, respectively) of the input signal is calculated in advance by, for example, |X_bar(k, n)|=(|X(k, n−2)|+|X(k, n−1)|+|X(k, n)|+|X(k, n+1)|+|X(k, n+2)|)/5. (2) The difference between the short-time moving average (|X_bar(k, n)|) and a value (α2(k, n)·N(k, n)) after replacement is calculated, and if the difference is large, the value of α2(k, n) is changed to decrease the difference. If the changed value is represented by α2_hat(k, n), the following methods may be used as a change method. (a) α2_hat(k, n)=0.5·α2(k, n) is uniformly set (constant multiplication is performed by a predetermined value). (b) α2_hat(k, n)=|X_bar(k, n)|/|N(k, n)| is set (calculation is performed using |X_bar(k, n)| and |N(k, n)|). (c) α2_hat(k, n)=0.8·|X_bar(k, n)|/|N(k, n)|+0.2 is set (same as above).

However, a method of obtaining α2(k, n) is not limited to the above-described one. For example, α2(k, n) which is a constant value regardless of the time may be set in advance. In this case, the value of α2(k, n) may be determined by actually hearing a processed signal. That is, the value of α2(k, n) may be determined in accordance with the characteristics of a microphone and a device to which the microphone is attached.

For example, when the following condition is met, the coefficient α2(k, n) may be obtained by dividing the short-time moving average |X_bar(k, n)| by the stationary component signal |N(k, n)| before and after time n using equations 1 to 3, and the input signal |X(k, n)| may be replaced by the short-time moving average |X_bar(k, n)| as a result. When the following condition is not met, α2(k, n)=α1(k, n) may be set.

|X(k,n)|>α1(k,n)·N(k,n) and α1(k,n)·N(k,n)−|X_bar(k, n)|>δ   Condition:

α2(k,n−1)=|X_bar(k,n)|/N(k,n)   Equation 1:

α2(k,n)=|X_bar(k,n)|/N(k,n)   Equation 2:

α2(k,n+1)=|X_bar(k,n)|/N(k,n)   Equation 3:

As described above, in the stationary component signal N(k, n), if it is impossible to prevent a "spike" of the amplitude component signal within a short time, it is possible to perform replacement using the short-time moving average, thereby improving the sound quality.

[Seventh Embodiment]

Figure 16:
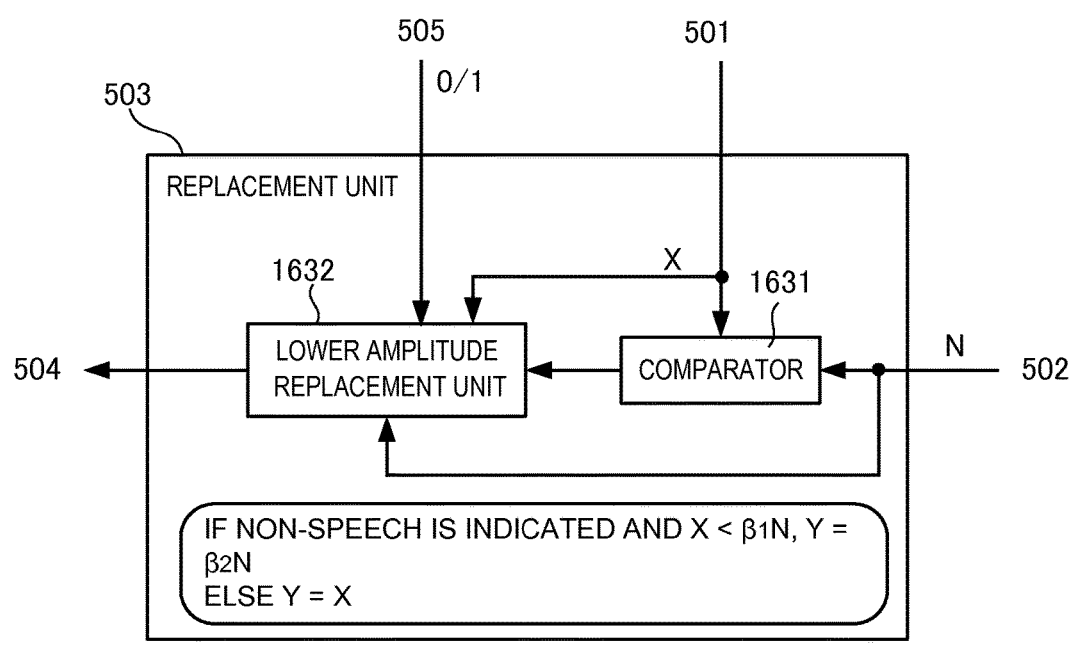
FIG. 16 is a block diagram showing the arrangement of a replacement unit according to the seventh embodiment of the present invention.

A signal processing apparatus according to the seventh embodiment of the present invention will be described with reference to FIG. 16. FIG. 16 is a block diagram for explaining the arrangement of a replacement unit 503 of the signal processing apparatus according to this embodiment. The replacement unit 503 according to this embodiment is different from the fifth embodiment in that a comparator 1631 and a smaller amplitude replacement unit 1632 are included. The rest of the components and operations is the same as in the fifth embodiment. Hence, the same reference numerals denote the same components and operations, and a detailed description thereof will be omitted.

The comparator 1631 compares a noisy signal amplitude spectrum |X(k, n)| with a multiple of β1(k, n) of a stationary component signal N(k, n). If the amplitude (power) component |X(k, n)| is smaller than the multiple of β1(k, n) of the stationary component signal N(k, n) in a non-speech section, the smaller amplitude replacement unit 1632 performs replacement by a multiple of β2(k, n) of the stationary component signal N(k, n); otherwise, the spectrum shape is directly used as an output signal Y(k, n) of the replacement unit 503. That is, the smaller amplitude replacement unit 1632 receives a speech presence/absence signal (0/1) from a speech detector 505. If the signal indicates non-speech and |X(k, n)|<β1(k, n)N(k, n), |Y(k, n)|=β2(k, n)N(k, n) is obtained; otherwise, |Y(k, n)|=|X(k, n)| is obtained.

This is effective when a variation in input signal is large in a frequency band in which power is smaller than the threshold β1(k, n)N(k, n) obtained by multiplying a stationary component signal by the predetermined coefficient in a non-speech band. On the other hand, since it is possible to maintain the naturalness in a speech band or a band in which power is larger than the threshold β1(k, n)N(k, n) obtained by multiplying the stationary component signal by the predetermined coefficient, the sound quality improves.

At each time, β(k, n) can be obtained according to a procedure of (1)→(2) below.

(1) A short-time moving average X_bar(k, n) (k and n are indices corresponding to the frequency and time, respectively) of the input signal is calculated in advance by, for example, X_bar(k, n)=(X(k, n−2)+X(k, n−1)+X(k, n)+X(k, n+1)+X(k, n+2))/5. (2) The difference between the short-time moving average (X_bar(k, n)) and a value (β2(k, n)·N(k, n)) after replacement is calculated, and if the difference is large, the value of β2(k, n) is changed to decrease the difference. If the changed value is represented by β2_hat(k, n), the following methods may be used as a change method. (a) β2_hat(k, n)=0.5·β2(k, n) is uniformly set (constant multiplication is performed by a predetermined value). (b) β2_hat(k, n)=(X_bar(k, n)/N(k, n) is set (calculation is performed using X_bar(k, n) and N(k, n)). (c) β2_hat(k, n)=0.8·X_bar(k, n)/N(k, n)+0.2 (same as above).

However, a method of obtaining β2(k, n) is not limited to the above-described one. For example, β2(k, n) which is a constant value regardless of the time may be set in advance. In this case, the value of β2(k, n) may be determined by actually hearing a processed signal. That is, the value of β2(k, n) may be determined in accordance with the characteristics of a microphone and a device to which the microphone is attached.

For example, when the following condition is met, the coefficient β2(k, n) may be obtained by dividing the short-time moving average |X_bar(k, n)| by the stationary component signal N(k, n) before and after time n using equations 1 to 3, and the input signal |X(k, n)| may be replaced by the short-time moving average |X_bar(k, n)| as a result. When the following condition is not met, β2(k, n)=β1(k, n) may be set.

$$|X(k,n)|>\beta1(k,n)\cdot N(k,n) \text{ and } \beta1(k,n)\cdot N(k,n)-|X\_bar(k,n)|>\delta$$ Condition:

$$\beta2(k,n-1)=X\_bar(k,n)/N(k,n)$$ Equation 1:

$$\beta2(k,n)=X\_bar(k,n)/N(k,n)$$ Equation 2:

$$\beta2(k,n+1)=X\_bar(k,n)/N(k,n)$$ Equation 3:

As described above, in the stationary component signal N(k, n), if it is impossible to prevent a "spike" of the amplitude component within a short time, it is possible to perform replacement using the short-time moving average, thereby improving the sound quality.

[Eighth Embodiment]

Figure 17:
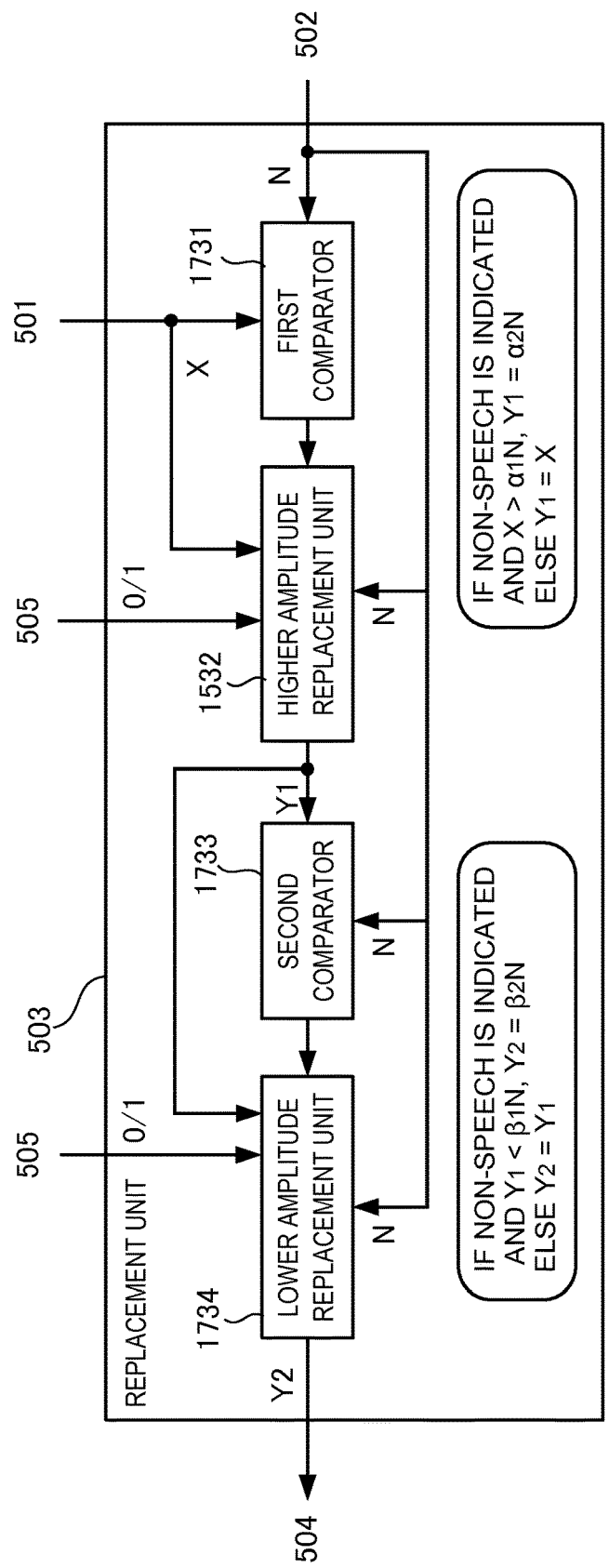
FIG. 17 is a block diagram showing the arrangement of a replacement unit according to the eighth embodiment of the present invention.

A signal processing apparatus according to the eighth embodiment of the present invention will be described with reference to FIG. 17. FIG. 17 is a block diagram for explaining the arrangement of a replacement unit 503 of the signal processing apparatus according to this embodiment. The replacement unit 503 according to this embodiment is different from the sixth embodiment in that a first comparator 1731, a second comparator 1733 and a smaller amplitude replacement unit 1734 are included. The rest of the components and operations is the same as in the fifth embodiment. Hence, the same reference numerals denote the same components and operations, and a detailed description thereof will be omitted.

The comparator 1731 compares a noisy signal amplitude spectrum |X(k, n)| with a first threshold obtained by calculating a stationary component spectrum N(k, n) by a linear mapping function. A larger amplitude replacement unit 1532 receives a speech presence/absence signal (0/1) from a speech detector 505. If the signal indicates non-speech and |X(k, n)|>α1(k, n)N(k, n), |Y(k, n)1|=α2N(k, n) is obtained; otherwise, |Y1(k, n)|=|X(k, n)| is obtained. That is, if the amplitude (power) component |X(k, n)| is larger than a multiple of α1(k, n) of the stationary component signal N(k, n) in a non-speech section, the larger amplitude replacement unit 1532 performs replacement by a multiple of α2(k, n) of the stationary component signal N(k, n); otherwise, the spectrum shape is directly used as an output signal Y1(k, n) to the second comparator 1733.

On the other hand, the smaller amplitude replacement unit 1734 receives the speech presence/absence signal (0/1) from the speech detector 505. The smaller amplitude replacement unit 1734 performs replacement by a multiple of β2(k, n) of the stationary component signal N(k, n) only at a frequency at which the output signal Y1(k, n) from the larger amplitude replacement unit 1532 is smaller than a multiple of β1(k, n) of the stationary component signal N(k, n) in a non-speech section. At a frequency at which the output signal Y1(k, n) is larger than the multiple of β1(k, n), the spectrum shape is directly used as an output signal |Y2(k, n)|. That is, if |Y1(k, n)|<β1(k, n)N(k, n), |Y2(k, n)|=β2(k, n)N(k, n) is obtained; otherwise, |Y1(k, n)|=|Y2(k, n)| is obtained.

This is effective when a variation in input signal is large in a frequency band in which power is larger than the threshold α1(k, n)N(k, n) obtained by multiplying the stationary component signal by the predetermined coefficient and a frequency band in which power is smaller than the threshold β1(k, n)N(k, n) and when the characteristic of the spectrum shape preferably remains as much as possible in a speech section.

[Ninth Embodiment]

A signal processing apparatus according to the ninth embodiment of the present invention will be described with reference to FIG. 18. FIG. 18 is a block diagram for explaining the arrangement of a replacement unit 503 of the signal processing apparatus according to this embodiment. The replacement unit 503 according to this embodiment is different from the sixth embodiment in that a larger amplitude replacement unit 1832 performs replacement using a multiple of a coefficient α(k, n) of a noisy amplitude signal |X(k, n)|. The rest of the components and operations is the same as in the sixth embodiment. Hence, the same reference numerals denote the same components and operations, and a detailed description thereof will be omitted.

If the amplitude (power) component |X(k, n)| is larger than a multiple of α1(k, n) of the stationary component signal N(k, n), the larger amplitude replacement unit 1832 performs replacement by a multiple of α2 of the input amplitude component signal |X(k, n)|; otherwise, the spectrum shape is directly used as an output signal |Y(k, n)| of the replacement unit 503. That is, if |X(k, n)|>α1(k, n)N(k, n), |Y(k, n)|=α2|X(k, n)| is obtained; otherwise, |Y(k, n)|=|X(k, n)| is obtained.

This is effective when a variation in input signal is large in a frequency band in which power is larger than the threshold α1(k, n)N(k, n) obtained by multiplying the stationary component signal by the predetermined coefficient and when the characteristic of the spectrum shape preferably remains as much as possible in an output signal. For example, this is effective when it is desirable to perform speech recognition while suppressing wind noise. On the other hand, since it is possible to maintain the naturalness in a band in which power is smaller than the threshold α1(k, n)N(k, n) obtained by multiplying the stationary component signal by the predetermined coefficient, the sound quality improves.

[Tenth Embodiment]

Figure 19:
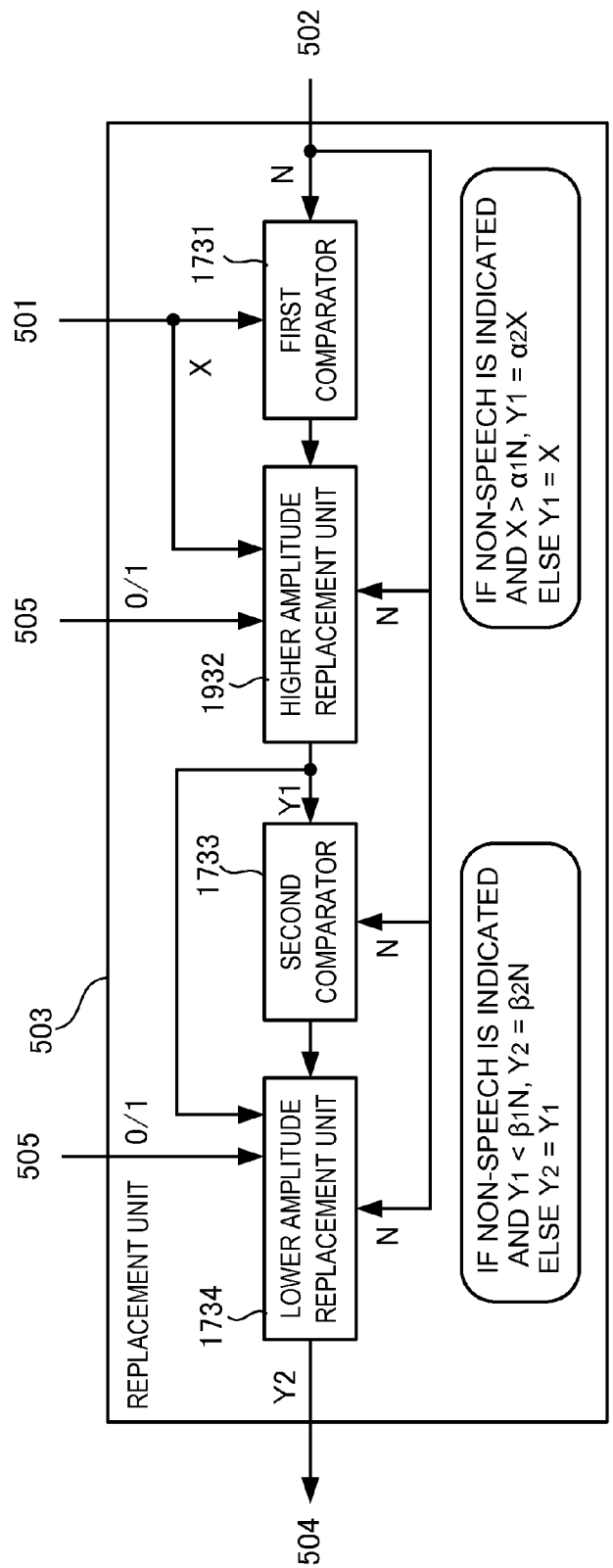
FIG. 19 is a block diagram showing the arrangement of a replacement unit according to the 10th embodiment of the present invention.

A signal processing apparatus according to the tenth embodiment of the present invention will be described with reference to FIG. 19. FIG. 19 is a block diagram for explaining the arrangement of a replacement unit 503 of the signal processing apparatus according to this embodiment. The replacement unit 503 according to this embodiment is different from the eighth embodiment in that a larger amplitude replacement unit 1932 performs replacement using a multiple of a coefficient α2(k, n) of a noisy amplitude signal |X(k, n)|, similarly to the larger amplitude replacement unit 1832 according to the ninth embodiment. The rest of the components and operations is the same as in the eighth embodiment. Hence, the same reference numerals denote the same components and operations, and a detailed description thereof will be omitted.

If the amplitude (power) component |X(k, n)| is larger than a multiple of α1(k, n) of a stationary component signal N(k, n) in a non-speech section, the larger amplitude replacement unit 1932 performs replacement by the multiple of α2(k, n) of the input amplitude component signal |X(k, n)|; otherwise, the spectrum shape is directly used as an output signal Y(k, n) of the replacement unit 503. That is, if $|X(k, n)|>\alpha1(k, n)N(k, n)$, $|X(k, n)|=\alpha2|X(k, n)|$ is obtained; otherwise, $|X(k, n)|=|X(k, n)|$ is obtained.

This is effective when a variation in input signal is large in a frequency band in which power is larger than the threshold $\alpha1(k, n)N(k, n)$ obtained by multiplying the stationary component signal by the predetermined coefficient and when the characteristic of the spectrum shape preferably remains as much as possible in an output signal. For example, when it is desirable to recognize speech in speech section while suppressing wind noise in a non-speech section, even if a non-speech section is determined, the spectrum shape in a section where power is large remains. Therefore, even if speech presence/absence determination is wrong, it is possible to improve the speech recognition accuracy.

[Application Field]

As described in Section 2.2 of non-patent literature 1, speech detection explained in the first embodiment includes the following applications.

(1) It is possible to reduce a transfer fee by excluding a signal in a non-speech section from an input signal, and encoding and transmitting only a speech section. Alternatively, it is possible to more effectively perform higher-quality information communication by changing a bit rate between a speech section and a non-speech section at the time of encoding.

(2) It is possible to perform high-performance signal processing by separating noise processing, dereverberation processing, sound source separation processing, and echo cancellation processing between a non-speech section and a speech section.

(3) It is possible to reduce a recognition error by separating a speech section and a non-speech section and setting only the speech section as a recognition target when applying a speech recognition technique.

On the other hand, as described in non-patent literature 2 (the second paragraph of Section 4.1.3 "Experimental Method"), non-patent literature 3 (FIG. 1), non-patent literature 4 (p. 26, FIG. 2), and the like, speech identification described in the second embodiment includes the following applications.

(1) Speech identification is used to improve the speech recognition performance. Gender-segregated recognition models ("gender-dependent models") are learned.

(2) A specific person who talked at a specific time is determined when analyzing speech data of a conference which a plurality of persons joined.

(3) A specific person who talked at a specific time is determined when automatically creating subtitles for a TV broadcast or movie.

[Other Embodiments]

Although the present invention has been explained with reference to the embodiments, the present invention is not limited to the above-described embodiments. The arrangement and details of the present invention can variously be modified without departing from the spirit and scope thereof, as will be understood by those skilled in the art. The present invention also incorporates a system or apparatus that combines different features included in the embodiments in any form.

The present invention may be applied to a system including a plurality of devices or a single apparatus. The present invention is also applicable even when a signal processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. In particular, the present invention incorporates a non-transitory computer readable medium storing the signal processing program for causing a computer to execute processing steps included in the above-described embodiments.

As an example, a processing procedure executed by a CPU 2002 provided in a computer 2000 when the speech processing explained in the first embodiment is implemented by software will be described below with reference to FIG. 20.

An input signal is transformed into an amplitude component signal in the frequency domain (S2001). The norm of a change in the amplitude component signal in the frequency direction is calculated (S2003). The calculated norm of the change is accumulated (S2005). Speech in the input signal is analyzed in accordance with the accumulated value (S2007).

Program modules for executing these processes are stored in a memory 2004. When the CPU 2002 sequentially executes the program modules stored in the memory 2004, it is possible to obtain the same effects as those in the first embodiment.

Similarly, as for the second to 10th embodiments, when the CPU 2002 executes program modules corresponding to the functional components described with reference to the block diagrams from the memory 2004, it is possible to obtain the same effects as those in the embodiments.

[Other Expressions of Embodiments]

Some or all of the above-described embodiments can also be described as in the following supplementary notes but are not limited to the followings.

(Supplementary Note 1)

There is provided a signal processing apparatus comprising:

a transformer that transforms an input signal into an amplitude component signal in a frequency domain;

a calculator that calculates a norm of a change in the amplitude component signal in a frequency direction;

an accumulator that accumulates the norm of the change calculated by the calculator; and an analyzer that analyzes a sound in the input signal in accordance with an accumulated value calculated by the accumulator.

(Supplementary Note 2)

There is provided the signal processing apparatus according to supplementary note 1, wherein the analyzer determines the existence of a sound in the input signal in accordance with the accumulated value.

(Supplementary Note 3)

There is provided the signal processing apparatus according to supplementary note 1 or 2, characterized by further comprising:

a frequency direction smoother that smoothes the amplitude component signal in the frequency direction, wherein the calculator calculates a norm of a change, in the frequency direction, in the amplitude component signal smoothed by the frequency direction smoother, the accumulator accumulates the norm of the change calculated by the calculator, and the analyzer determines the existence of one of female speech and child speech based on the accumulated value.

(Supplementary Note 4)

There is provided the signal processing apparatus according to any one of supplementary notes 1 to 3, characterized by further comprising:

a time direction smoother that smoothes the amplitude component signal in a time direction, wherein the calculator calculates a norm of a change, in the frequency direction, in the amplitude component signal smoothed by the time direction smoother, the accumulator accumulates the norm of the change calculated by the calculator, and the analyzer determines the existence of male speech based on the accumulated value.

(Supplementary Note 5)

There is provided the signal processing apparatus according to supplementary note 1 or 2, characterized in that the analyzer determines the existence of a voice of a specific person by comparing the accumulated value with an accumulated value which is stored in advance and is associated with the voice of the specific person.

(Supplementary Note 6)

There is provided a signal processing method comprising:

transforming an input signal into an amplitude component signal in a frequency domain;

calculating a norm of a change in the amplitude component signal in a frequency direction; and accumulating the norm of the change calculated in the calculating.

(Supplementary Note 7)

There is provided a signal processing program for causing a computer to execute a method, comprising:

transforming an input signal into an amplitude component signal in a frequency domain;

calculating a norm of a change in the amplitude component signal in a frequency direction; and accumulating the norm of the change calculated in the calculating.

This application claims the benefit of Japanese Patent Application No. 2013-83412 filed on Apr. 11, 2013, which is hereby incorporated by reference herein in its entirety.

What is claimed is:

1. A signal processing apparatus comprising:

a processor; and a memory configured to store instructions executable by the processor, wherein the processor is configured to:

transform input signal samples into frames of amplitude components representing different frequencies in a frequency domain;

smooth the amplitude components along time to obtain time-smoothed amplitude components, smooth the time-smoothed amplitude components along frequency to obtain frequency-smoothed amplitude components;

calculate differences of the frequency-smoothed amplitude components along the frequency;

accumulate the differences to obtain an accumulated value; and analyze the input signal samples to detect a male voice in accordance with the accumulated value.

2. The signal processing apparatus according to claim 1, wherein said processor is further configured to detect a female voice or a child voice in the input signal samples in accordance with the accumulated value.

3. The signal processing apparatus according to claim 1, wherein said processor is further configured to detect a voice of a specific person by comparing the accumulated value with an accumulated value of the specific person which is stored in advance.

4. A signal processing method implemented using a signal processing apparatus, the method comprising:

transforming, by the signal processing apparatus, input signal samples into frames of amplitude components representing different frequencies in a frequency domain;

smoothing, by the signal processing apparatus, the amplitude components along time to obtain time-smoothed amplitude components, smoothing, by the signal processing apparatus, the time-smoothed amplitude components along frequency to obtain frequency-smoothed amplitude components;

calculating, by the signal processing apparatus, differences of the frequency-smoothed amplitude components along the frequency;

accumulating, by the signal processing apparatus, the differences to obtain an accumulated value; and analyzing, by the signal processing apparatus, the input signal samples to detect a male voice in accordance with the accumulated value.

5. A non-transitory computer readable medium storing a signal processing program for causing a signal processing apparatus to execute a method comprising:

transforming input signal samples into frames of amplitude components representing different frequencies in a frequency domain;

smoothing the amplitude components along time to obtain time-smoothed amplitude components, smoothing the time-smoothed amplitude components along frequency to obtain frequency-smoothed amplitude components;

calculating differences of the frequency-smoothed amplitude components along the frequency;

accumulating the differences to obtain an accumulated value; and analyzing the input signal samples to detect a male voice in accordance with the accumulated value.

* * * * *